United States Patent
Fukai et al.

(10) Patent No.: US 11,003,047 B2
(45) Date of Patent: May 11, 2021

(54) LENS BARREL, LENS DRIVING DEVICE, AND IMAGE PICKUP APPARATUS

(71) Applicant: CANON KABUSHIKI KAISHA, Tokyo (JP)

(72) Inventors: Yosuke Fukai, Kawasaki (JP); Hideki Kawashima, Tokyo (JP); Kenichi Katano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 16/029,153

(22) Filed: Jul. 6, 2018

(65) Prior Publication Data

US 2018/0314134 A1 Nov. 1, 2018

Related U.S. Application Data

(62) Division of application No. 15/238,289, filed on Aug. 16, 2016, now Pat. No. 10,185,206.

(30) Foreign Application Priority Data

Aug. 20, 2015 (JP) .................................. 2015-162686
Feb. 5, 2016 (JP) .................................. 2016-020746

(51) Int. Cl.
*G02B 5/02* (2006.01)
*G03B 5/02* (2021.01)
(Continued)

(52) U.S. Cl.
CPC .................. *G03B 5/02* (2013.01); *G02B 7/10* (2013.01); *G02B 7/102* (2013.01); *G02B 27/646* (2013.01); *G03B 2205/0046* (2013.01)

(58) Field of Classification Search
CPC ........ G02B 27/646; G02B 7/10; G02B 7/102; G03B 2205/0046; G03B 5/02
See application file for complete search history.

(56) References Cited

U.S. PATENT DOCUMENTS 4,413,894 A * 11/1983 Miki ...................... G03B 17/14
359/824
5,663,842 A 9/1997 Takayama et al.
(Continued)

FOREIGN PATENT DOCUMENTS

CN 1469151 A 1/2004
CN 102055910 A 5/2011
(Continued)

OTHER PUBLICATIONS

The above U.S. Publications 1-2 and foreign patent documents 1-4 were cited in a Dec. 21, 2019 Chinese Office Action, which is enclosed with an English Translation, that issued in Chinese Patent Application No. 201610682620.7.
(Continued)

*Primary Examiner* — Joseph P Martinez
*Assistant Examiner* — Vipin Patel
(74) *Attorney, Agent, or Firm* — Cowan, Liebowitz & Latman, P.C.

(57) ABSTRACT

A lens barrel that is capable of miniaturizing and thinning an image pickup apparatus by enabling to switch manual lens drive and electric lens drive with a simple mechanism. A lens barrel is mounted on an image pickup apparatus that supports an operation member rotatably. A drive barrel engages with a lens holding member to drive it in an optical axis direction. A motor transfers rotation to the drive barrel through a transfer mechanism. A switching mechanism switches between electric lens drive that drives the lens holding member by transferring rotation of the motor to the drive barrel and manual lens drive that drives the lens holding member by transferring rotation of the operation member to the drive barrel via an elastic member that rotates together with the operation member according to a user's (Continued)

operation. The drive barrel engages with the elastic member while shifting to a photographing area.

10 Claims, 29 Drawing Sheets

(51) Int. Cl.
  *G02B 7/10* (2021.01)
  *G02B 27/64* (2006.01)

(56) References Cited

U.S. PATENT DOCUMENTS

| | | | | |
|---|---|---|---|---|
| 5,969,889 | A | * | 10/1999 | Iikawa ................ G02B 7/08 359/823 |
| 2004/0081442 | A1 | | 4/2004 | Suzuki |
| 2005/0063694 | A1 | | 3/2005 | Nakazawa |
| 2006/0104624 | A1 | | 5/2006 | Nakata et al. |
| 2011/0109788 | A1 | * | 5/2011 | Santo ................ G02B 7/023 348/345 |
| 2013/0333495 | A1 | | 12/2013 | Hamada et al. |

FOREIGN PATENT DOCUMENTS

| | | | |
|---|---|---|---|
| CN | 102346288 | A | 2/2012 |
| CN | 102692692 | A | 9/2012 |
| CN | 102841485 | A | 12/2012 |
| CN | 103105662 | A | 5/2013 |
| CN | 103513392 | A | 1/2014 |
| CN | 104459963 | A | 3/2015 |
| JP | 01205112 | A * | 8/1989 |
| JP | 05-011163 | A | 1/1993 |
| JP | 2004138770 | A | 5/2004 |
| JP | 2006-259130 | A | 9/2006 |
| JP | 2008-058914 | A | 3/2008 |
| JP | 2012-042619 | A | 3/2012 |
| JP | 2013-083775 | A | 5/2013 |
| JP | 2013-200509 | A | 10/2013 |

OTHER PUBLICATIONS

The above foreign patent document was cited in a Dec. 24, 2019 Japanese Office Action, which is enclosed with an English Translation, that issued in Japanese Patent Application No. 2016020746.
The above documents were cited in a Dec. 28, 2020 Chinese Office Action, a copy of which is enclosed with an English Translation, that issued in Chinese Patent Application No. 201910363042.4.
The above documents were cited in a Jan. 7, 2021 Chinese Office Action, a copy of which is enclosed with an English Translation, that issued in Chinese Patent Application No. 201910695389.9.

* cited by examiner

LENS BARREL, LENS DRIVING DEVICE, AND IMAGE PICKUP APPARATUS

CROSS-REFERENCE TO RELATED APPLICATIONS

This application is a divisional of application Ser. No. 15/238,289, filed Aug. 16, 2016 the entire disclosure of which is hereby incorporated by reference.

BACKGROUND OF THE INVENTION

Field of the Invention

The present invention relates to a lens barrel installed in an image pickup apparatus, such as a digital camera, a digital video camera, and relates to an image pickup apparatus equipped with the lens barrel. Moreover, the present invention relates to a lens driving device of a digital camera equipped with a zoom lens barrel, and relates to an image pickup apparatus equipped with the lens driving device.

Description of the Related Art

There are some known image pickup apparatus, such as digital cameras, that enable zooming and focusing by moving lenses in accordance with a rotary operation of an operation ring provided on an outside periphery of a lens barrel. For example, a configuration that enables 25816/001/2122911.1 electric zoom drive and manual zoom drive that are selected using a changeover switch provided on a side portion of a lens barrel is disclosed (Japanese Laid-Open Patent Publication (Kokai) No. 2008-58914 (JP 2008-58914A), and Japanese Laid-Open Patent Publication (Kokai) No. 2006-259130 (JP 2006-259130A)).

Moreover, a configuration that enables an operation with feeling close to a manual operation by detecting a rotation amount of an operation ring and driving a lens electrically corresponding to the detected rotation amount is disclosed (Japanese Laid-Open Patent Publication (Kokai) No. H5-11163 (JP H5-11163A)). Furthermore, a configuration with a gear mechanism that receives two inputs to a lens barrel is disclosed (Japanese Laid-Open Patent Publication (Kokai) No. 2012-42619 (JP 2012-42619A)). The gear mechanism enables zoom drives by manual operation of an operation ring and by electric drive without providing a changeover switch.

Moreover, Japanese Laid-Open Patent Publication (Kokai) No. 2013-083775 (JP 2013-083775A) discloses a technique that transfers rotational force of a rotary operation of an operation ring to a zoom drive system through a clutch gear when a changeover switch between electric drive and manual drive is switched to the manual drive. This technique needs to operate the operation ring with rotary torque more than detent torque of a motor.

However, since the configurations in the above-mentioned JP 2008-58914A and JP 2006-259130A require a gear train that transfers the rotation of the operation ring to the lens barrel and the switching mechanism for moving a gear in an axial direction, the number of parts becomes large, which prevents the image pickup apparatus in addition to the lens barrel from miniaturizing.

Moreover, since the configuration in the above-mentioned JP H5-11163A accumulates an influence of backlash of the switching mechanism to the gear teeth when the rotation of the operation ring is transferred to the lens barrel through the gear train, the effect of shakiness of the switching mechanism to a gear tooth, time lag may occur between a rotary-operation timing of the operation ring and a drive timing of the lens.

Furthermore, although the configuration in the above-mentioned JP 2012-42619A solves the problem of the switching mechanism, a large space is needed in order to install the gearing mechanism that receives the two inputs, which prevents the image pickup apparatus in addition to the lens barrel from miniaturizing and thinning.

Moreover, since the technique in JP 2013-083775A makes the feeling of the manual rotary operation of the operation ring heavy because of friction of the gear train including the motor, the operability of the operation ring drops. And since the clutch gear is needed in the gear train, the configuration is complicated. Furthermore, when a worm is installed between the motor and the gear train, for example, an engagement relation (the number of threads) must be considered in order to rotate the motor smoothly by transmitting the rotational force of the operation ring to the motor through the gear train, which restricts the design.

SUMMARY OF THE INVENTION

The present invention provides a technique that miniaturizes and thins an image pickup apparatus in addition to a lens barrel by enabling to switch manual lens drive and electric lens drive with a simple mechanism, and that prevents time lag from generating between a rotary operation of an operation member and lens drive.

Moreover, the present invention provides a technique that enables to switch an electric operation and a manual operation by the operation member of the lens barrel with a simple mechanism, and to improve operability of the manual operation of the operation member.

Accordingly, a first aspect of the present invention provides a lens barrel mounted on an image pickup apparatus that supports an operation member rotatably, the lens barrel comprising a drive barrel configured to engage with a lens holding member that holds a lens and to drive the lens holding member in an optical axis direction by moving in the optical axis direction while rotating, a motor configured to transfer rotation to the drive barrel through a transfer mechanism, and a switching mechanism configured to switch lens drive between electric lens drive that drives the lens holding member in the optical axis direction by transferring rotation of the motor to the drive barrel and manual lens drive that drives the lens holding member in the optical axis direction by transferring rotation of the operation member to the drive barrel via an elastic member that rotates together with the operation member, according to a user's operation. The drive barrel engages with the elastic member while shifting from a non-photographing area to a photographing area in the optical axis direction so as to allow the rotation of the operation member to transfer.

Accordingly, a second aspect of the present invention provides an image pickup apparatus comprising an operation member configured to be supported by the image pickup apparatus so as to allow a rotary operation, an elastic member configured to be arranged in an inner periphery of the operation member, and to rotate together with the operation member, and the zoom lens barrel of the first aspect configured to change photographing magnification by moving a plurality of lens groups included in an optical axis direction.

Accordingly, a third aspect of the present invention provides a lens driving device comprising a motor, a gear train configured to transfer driving force of the motor, a drive barrel on which a gear part that is able to mesh with the gear train, that rotates when the driving force of the motor is transferred to the gear part via the gear train, and that moves a plurality of lens groups in an optical axis direction by rotating, and an operation member that is provided on the circumference side of the drive barrel so as to be movable in the optical axis direction and to allow a rotary operation, and that engages with the drive barrel in a rotation direction and the optical axis direction so as to be detachable. The drive barrel meshes with the operation member in the optical axis direction and moves in the optical axis direction together with the operation member so that the engagement between the gear part and the gear train is released and the drive barrel engages with the operation member in the rotation direction and rotates together with the operation member, when the operation member is moved in the optical axis direction.

Accordingly, a fourth aspect of the present invention provides an image pickup apparatus equipped with the lens driving device of the third aspect.

The first and second aspects of the present invention enable to miniaturize and thin the image pickup apparatus in addition to the lens barrel by enabling to switch manual lens drive and electric lens drive with a simple mechanism, and prevent time lag from generating between a rotary operation of the operation member and lens drive.

Moreover, the third and fourth aspects of the present invention enable to switch an electric operation and a manual operation by the operation member of the lens barrel with a simple mechanism, and to improve operability of the manual operation of the operation member.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
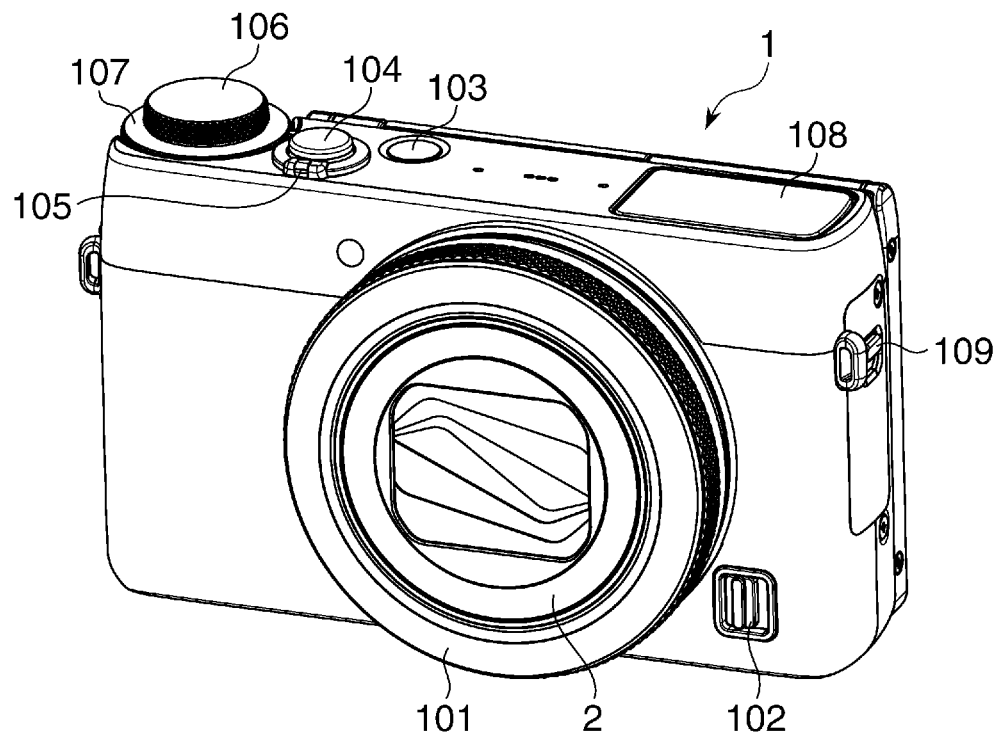
FIG. 1A is a perspective view showing a digital camera as an image pickup apparatus according to a first embodiment of the present invention viewed from a front side.
Figure 1B:
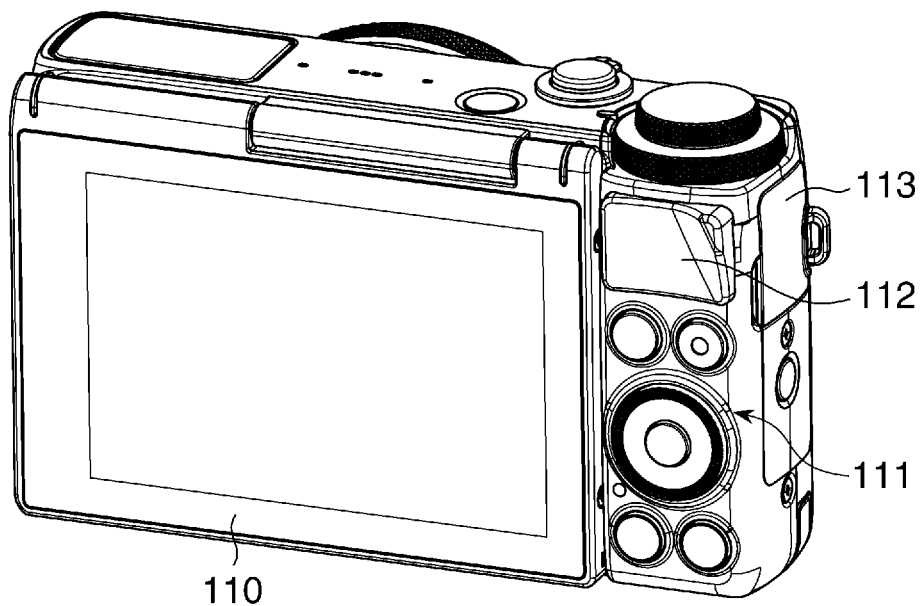
FIG. 1B is a perspective view showing the digital camera shown in FIG. 1A viewed from a rear side.

FIG. 1A is a perspective view showing a digital camera 1 as an image pickup apparatus according to a first embodiment of the present invention viewed from a front side. FIG. 1B is a perspective view showing the digital camera 1 shown in FIG. 1A viewed from a rear side.

As shown in FIG. 1A, the digital camera 1 of the embodiment is provided with a lens barrel 2 with a zoom lens system that changes photographing magnification by moving included lenses in an optical axis direction at the front side. A zoom operation ring 101 is provided around the lens barrel 2 so as to allow a rotary operation. A switching member 102 that enables a user to switch a zoom operation mode between electric zoom drive and manual zoom drive is provided in the vicinity of the zoom operation ring 101.

Moreover, a power button 103, release button 104, zoom lever 105, mode dial 106, exposure correction dial 107, and pop-up flash unit 108 are provided on an upper side of the digital camera 1. A pop-up lever 109 is provided on the right side portion of the digital camera 1 viewed from the front side. When the pop-up lever 109 is operated, a light emitting section of the flash unit 108 pops up and the flash unit 108 is ready for emission.

As shown in FIG. 1B, a display unit 110 that consists of an LCD, a manual operation button group 111, and a gripping part 112 are provided in the back side portion of the digital camera 1. Moreover, a terminal cover 113 that covers a terminal that is used to connect the digital camera 1 to an external device is provided on the right side portion of the digital camera 1 viewed from the rear side.

Figure 2:
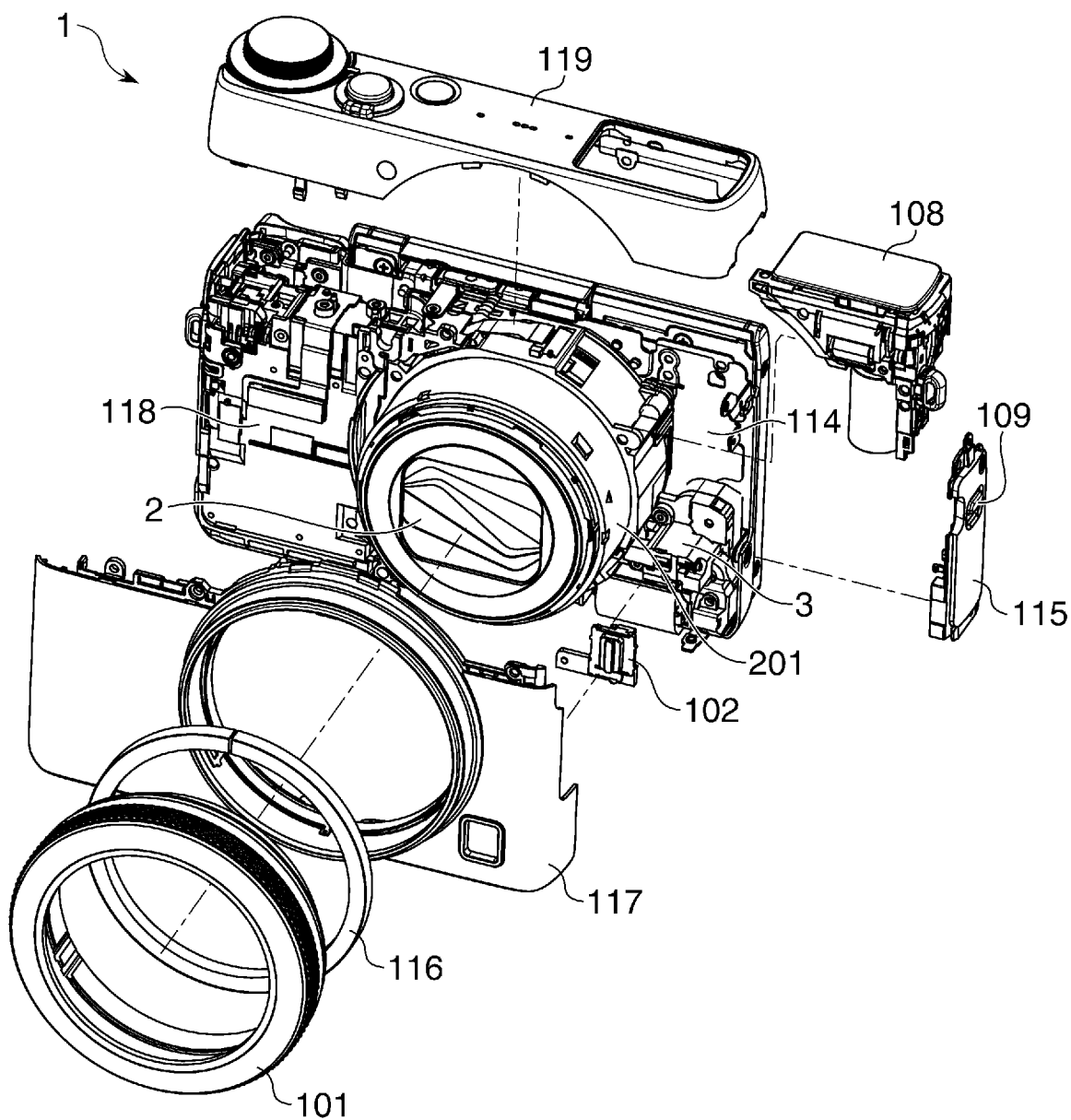
FIG. 2 is an exploded perspective view showing the digital camera shown in FIG. 1A.

FIG. 2 is an exploded perspective view showing the digital camera 1 shown in FIG. 1A. As shown in FIG. 2, a battery housing unit 118 is provided at the left side of the lens barrel 2 viewed from the front side of the digital camera 1. The flash unit 108 is provided at the right side of the lens barrel 2. The battery housing unit 118 and the flash unit 108 are respectively fixed to an inner flame 114.

The flash unit 108 is provided with a side cover 115 having the pop-up lever 109 that engages with the flash unit 108. A circuit board (not shown) is fixed to the back side of the battery housing unit 118. A CPU, memory, external connection connector, image processing LSI, etc. are implemented on the circuit board, which is connected to the lens barrel 2. Lens groups that constitute a photographing optical system, a lens-drive mechanism, and an Image pickup device, such as a CCD sensor or a CMOS sensor, are built into the lens barrel 2.

A front-side cover unit 117 and the zoom operation ring 101 are provided in the front side of the digital camera 1. A ring-shaped elastic member 116 made from cushioning material etc. that rotates together with the zoom operation ring 101 is fixed to the inner periphery of the zoom operation ring 101. The zoom operation ring 101 is supported so as to allow a rotary operation together with the elastic member 116 to the front-side cover unit 117.

The switching member 102 is attached to the front-side cover unit 117. The switching member 102 is used to switch the manual zoom drive and the electric zoom drive according to a user's operation, as mentioned above. The position of the switching member 102 is regulated by a switching mechanism having a click mechanism (not shown) to the front-side cover unit 117. When the front-side cover unit 117 is installed, the switching member 102 engages with a gear connection switching mechanism 3.

Figure 3A:
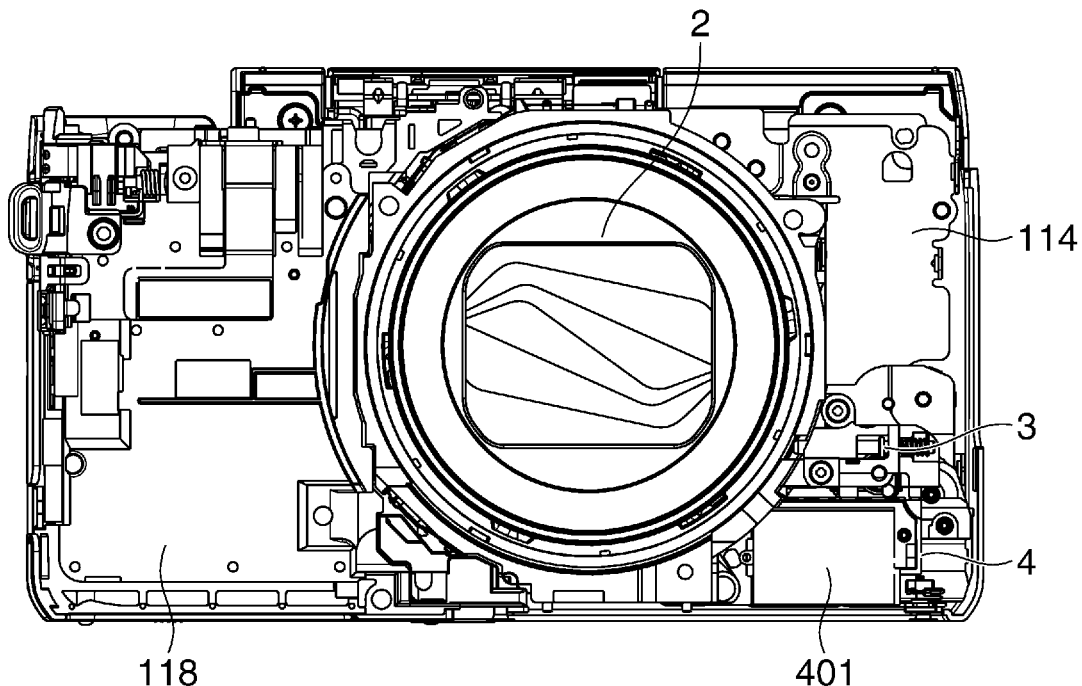
FIG. 3A is a view of a lens barrel fixed to an inner flame of the digital camera shown in FIG. 1A viewed from the front side.
Figure 3B:
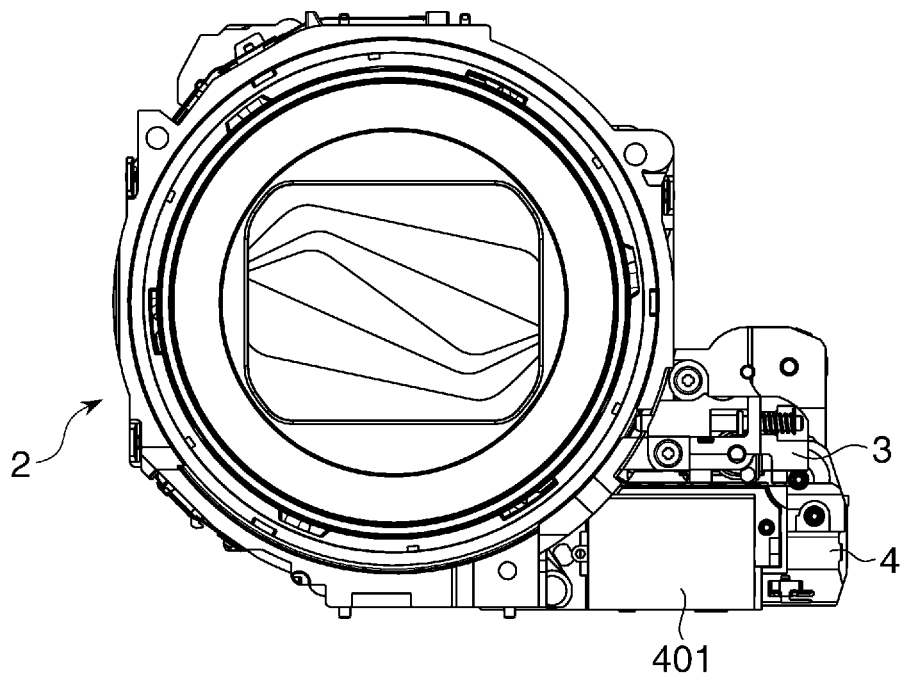
FIG. 3B is a view of the lens barrel viewed from the front side.

FIG. 3A is a view of the lens barrel 2 fixed to the inner flame 114 viewed from the front side. FIG. 3B is a view of the lens barrel 2 viewed from the front side. As shown in FIG. 3A and FIG. 3B, a gear box 4 that drives the zooming of the lens barrel 2 is arranged at the lower right portion of the lens barrel 2. A motor 401 is arranged at the bottom face portion. The gear connection switching mechanism 3 is attached to the upper side of the motor 401.

Figure 4:
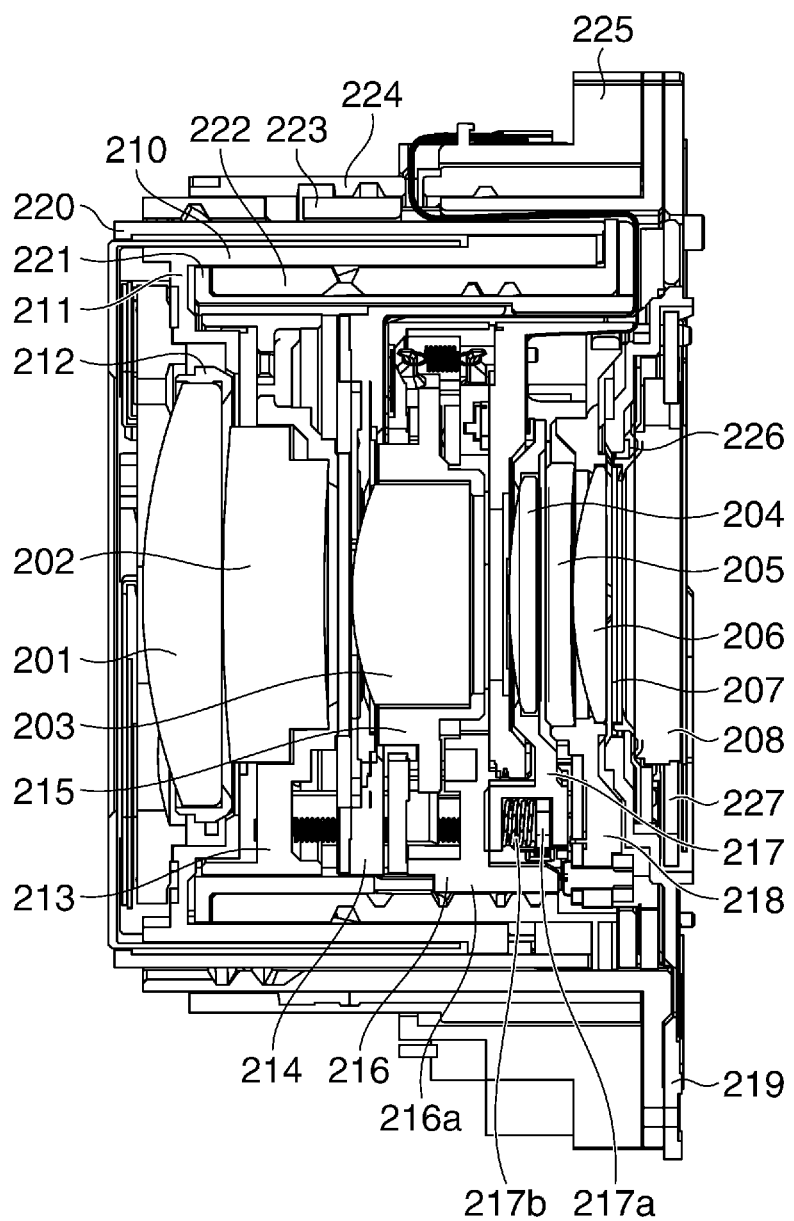
FIG. 4 is a sectional view showing the lens barrel shown in FIG. 3B in a collapsed position.
Figure 5:
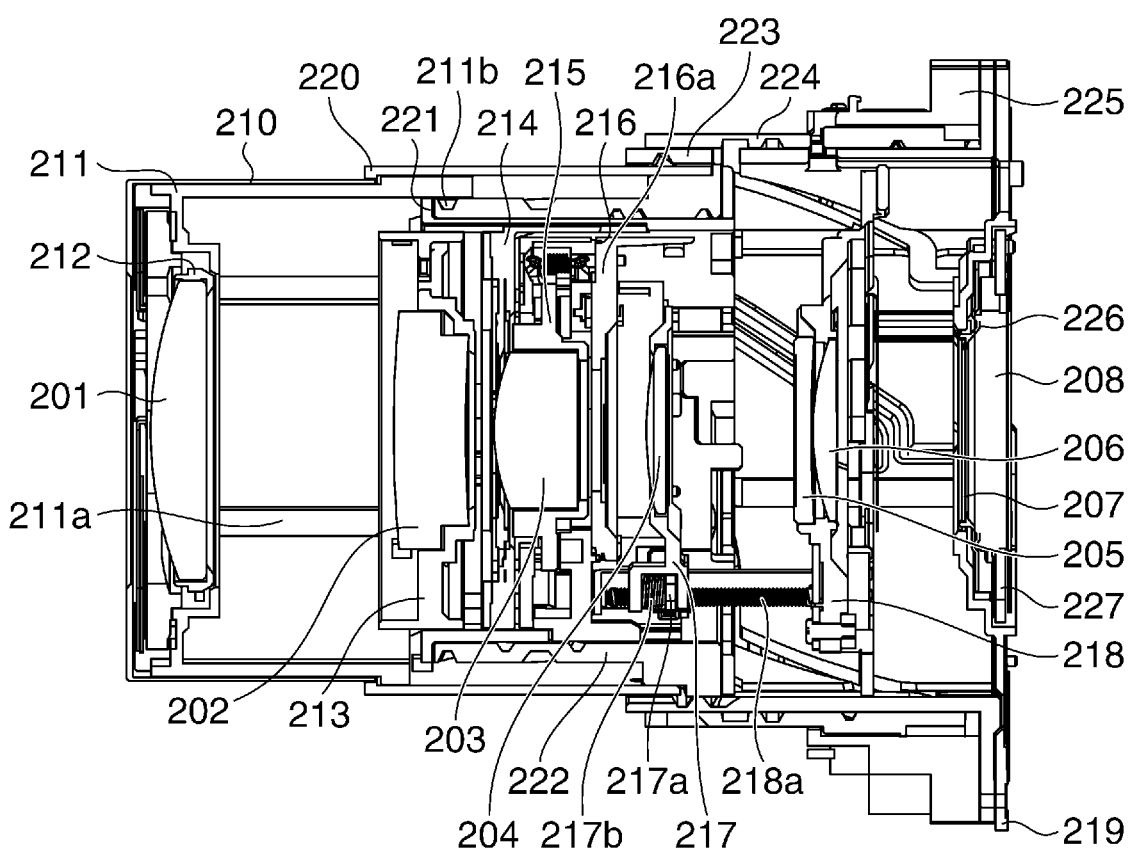
FIG. 5 is a sectional view showing the lens barrel shown in FIG. 3B in a photographing position.
Figure 6:
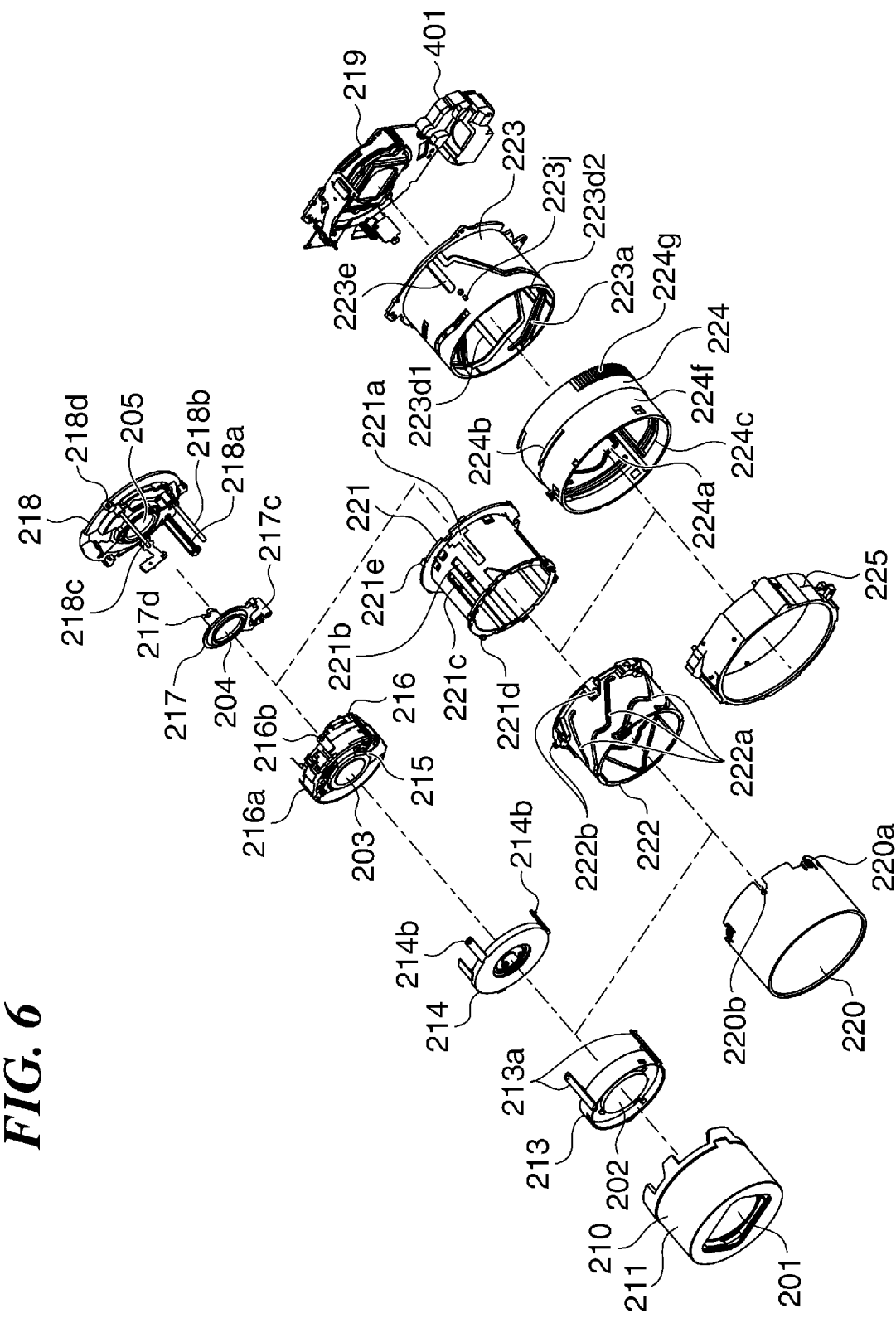
FIG. 6 is an exploded perspective view of the lens barrel shown in FIG. 3B.

FIG. 4 is a sectional view showing the lens barrel 2 in a collapsed position. FIG. 5 is a sectional view of the lens barrel 2 in a photographing position. FIG. 6 is an exploded perspective view of the lens barrel 2.

As shown in FIG. 4, FIG. 5, and FIG. 6, the lens barrel 2 is provided with a first group unit 210, a second-lens-group holding member 213, a third group unit 216, a fourth-lens-group holding member 217, and a fifth-lens-group holding member 218. A diaphragm unit 214 as a light-amount adjusting member at the time of photography is provided between the second-lens-group holding member 213 and the third group unit 216.

The first group unit 210 is provided with a first-lens-group holding member 212 holding a first lens 201, and a first group base plate 211 that holds the first-lens-group holding member 212 and has a barrier member that protects the first lens 201. The second-lens-group holding member 213 holds a second lens 202. The third group unit 216 is provided with a third group lens holding portion 215 holding a third lens 203, and a third group base plate 216a having a shutter member (not shown). The third group unit 216 has an image stabilization mechanism that moves the third group lens holding portion 215 in a direction perpendicular to an optical axis during photography so as to correct an effect of a camera shake at the time of photography, etc.

The fourth-lens-group holding member 217 holds the fourth lens 204 which constitutes a focusing lens. The fifth-lens-group holding member 218 holds a fifth lens 205 and a sixth lens 206 that constitute a fifth lens group, and holds the fourth-lens-group holding member 217 movable in an optical axis direction. An optical system in the lens barrel 2 is constituted by five lens groups as mentioned above, and a zoom operation is performed by moving the lenses of the respective groups in the optical axis direction.

As shown in FIG. 6, the lens barrel 2 has a cover barrel 225 constituting a zoom mechanism, and a sensor holder unit 219 fixed to the cover barrel 225 with screws. As shown in FIG. 4, FIG. 5, and FIG. 6, the sensor holder unit 219 holds an image pickup device 208 through a sensor plate 227. An optical filter 207 is arranged at the front side (object side) of the image pickup device 208 so as to be pinched between the sensor holder unit 219 and a sensor rubber 226.

Moreover, as shown in FIG. 6, the motor 401 is provided in the sensor holder unit 219.

As shown in FIG. 4 and FIG. 5, the fifth-lens-group holding member 218 supports the fourth-lens-group holding member 217 so as to allow a rectilinear movement in the optical axis direction. A nut portion 217a is provided in the fourth-lens-group holding member 217. The nut portion 217a is energized by a spring 217b toward the fourth-lens-group holding member 217 in the optical axis direction, and is movable in the optical axis direction together with the fourth-lens-group holding member 217.

The fifth-lens-group holding member 218 is provided with a driving source 218a in which a screw shaft for driving the fourth-lens-group holding member 217 is formed. Moreover, as shown in FIG. 6, a main guide shaft 218b arranged in parallel to the optical axis and a sub guide shaft 218c for regulating rotation are fixed to the fifth-lens-group holding member 218 by press fit etc.

The pair of guide shafts 218b and 218c are respectively fitted into guide parts 217c and 217d formed in the fourth-lens-group holding member 217 so as to be movable in the optical axis direction. When the driving source 218a in the fifth-lens-group holding member 218 is driven, the screw shaft that meshes with the nut portion 217a rotates, and the fourth-lens-group holding member 217 is driven in the optical axis direction. Accordingly, the fourth-lens-group holding member 217 and the fifth-lens-group holding member 218 function as a focusing lens mechanism.

As shown in FIG. 4 and FIG. 5, a moving cam barrel 222 is provided around the second-lens-group holding member 213, third group unit 216, fourth-lens-group holding member 217, and fifth-lens-group holding member 218. As shown in FIG. 6, three kinds of cam grooves 222a of which loci differ are formed in the periphery of the moving cam barrel 222. Follower pins 213a, 214b, and 216b, which are respectively formed in the outer peripheries of the second-lens-group holding member 213, diaphragm unit 214, and third group unit 216, respectively engage with the three kinds of cam grooves 222a, and follow them.

Moreover, a rectilinear guide barrel 221, which regulates rotation of the lens groups during movement, is provided inside the moving cam barrel 222. The rectilinear guide barrel 221 and the moving cam barrel 222 are connected by bayonet connection, and they move approximately integrally in the optical axis direction. The moving cam barrel 222 is relatively rotatable to the rectilinear guide barrel 221.

As shown in FIG. 6, rectilinear grooves 221a, 221b, and 221c prolonged in the optical axis direction are formed in the rectilinear guide barrel 221. These rectilinear grooves 221a, 221b, and 221c enable the second-lens-group holding member 213, diaphragm unit 214, and third group unit 216 to move rectilinearly in the optical axis direction without rotating.

The first group base plate 211 of the first group unit 210 is arranged around the moving cam barrel 222. A follower-pin 211b (see FIG. 5) is formed on the inner periphery of the first group base plate 211. The follower pin 211b engages with the cam groove 222a formed in the outer periphery of the moving cam barrel 222 and follows the cam groove 222a. Moreover, a linear guide groove 211a (see FIG. 5) is formed in the inner periphery of the first group base plate 211. A guide projection 221d (see FIG. 6) formed in the rectilinear guide barrel 221 is fitted into the linear guide groove 211a so as to be movable in the optical axis direction. This allows the first group unit 210 to move rectilinearly in the optical axis direction without rotating.

According to the above-mentioned configuration, the rotation of the moving cam barrel 222 moves the first group unit 210, second-lens-group holding member 213, diaphragm unit 214, and third group unit 216, which follow the moving cam barrel 222, rectilinearly in the optical axis direction without rotating.

A decorative barrel 220 is provided around the first group unit 210 together with the moving cam barrel 222. A fixed cam barrel 223 is arranged around the moving cam barrel 222. A drive barrel 224 is arranged around the fixed cam barrel 223. And the cover barrel 225 is arranged around the drive barrel 224. As shown in FIG. 4, FIG. 5, and FIG. 6, the fixed cam barrel 223 is stationarily arranged in a state to be nipped between the cover barrel 225 and the sensor holder unit 219.

Figure 7:
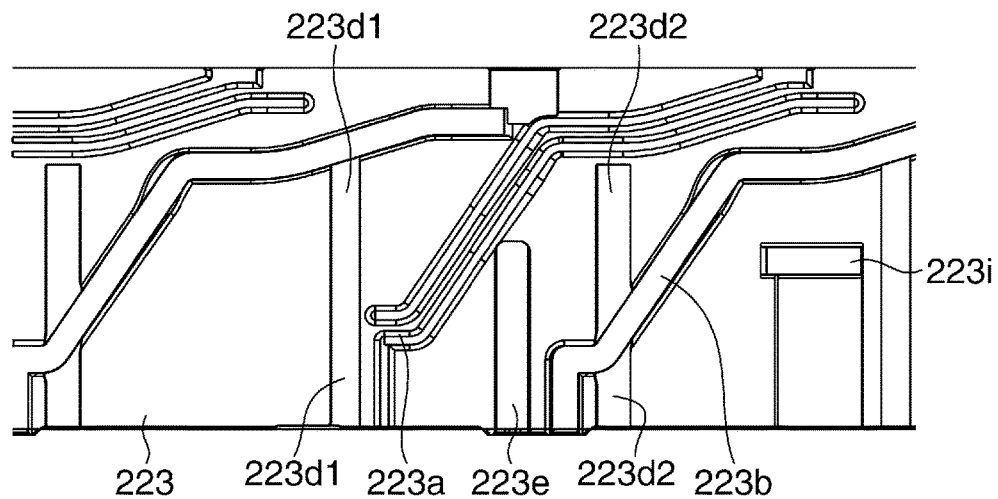
FIG. 7 is a development view showing an inner periphery of a fixed cam barrel in the lens barrel shown in FIG. 3B.
Figure 8:
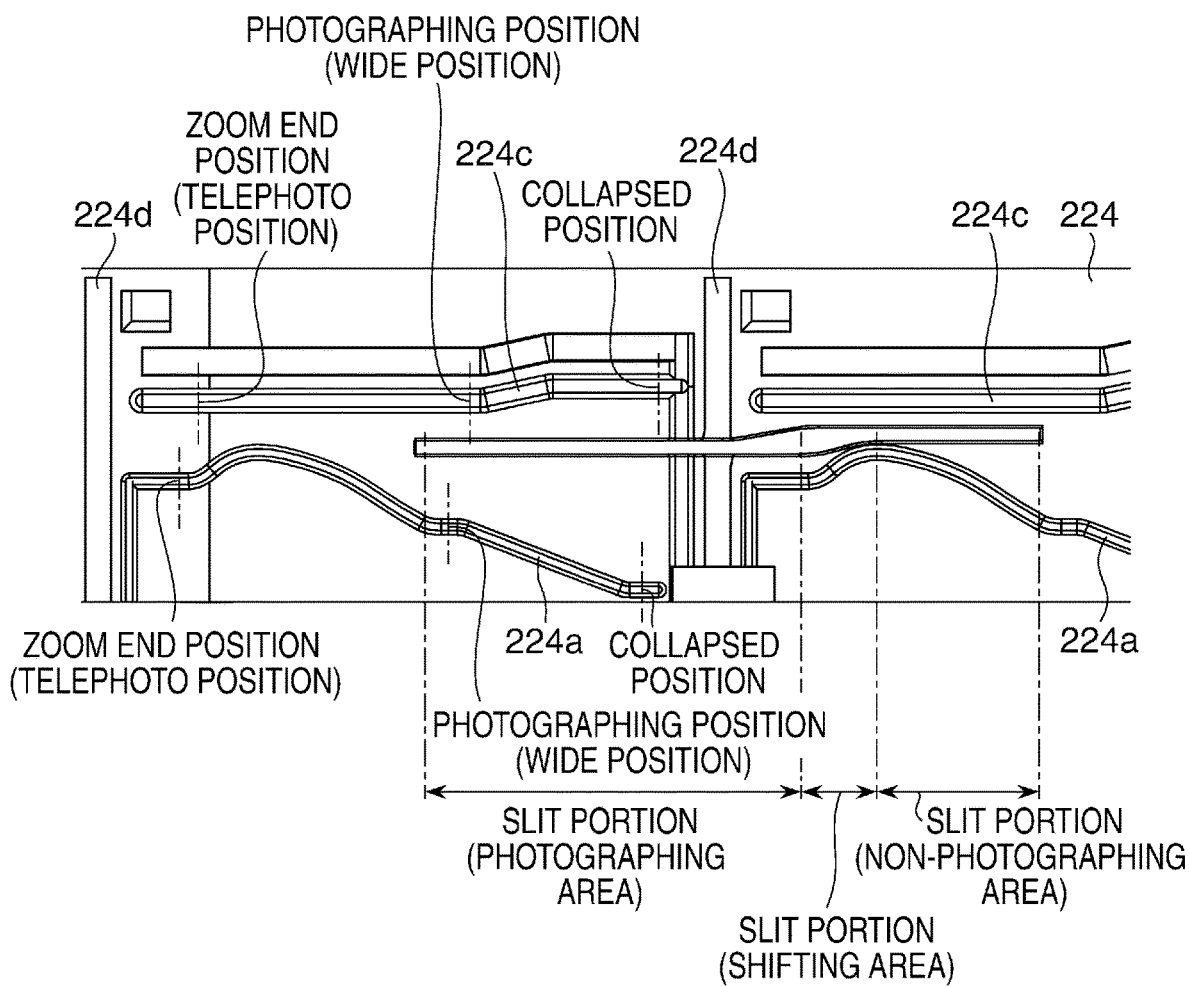
FIG. 8 is a developed view showing an inner periphery of a drive barrel in the lens barrel shown in FIG. 3B.

FIG. 7 is a development view showing the inner periphery of the fixed cam barrel 223. FIG. 8 is a development view showing the inner periphery of the drive barrel 224.

As shown in FIG. 7, a cam groove 223a and linear guide grooves 223d1 and 223d2 prolonged in the optical axis direction are formed in the inner periphery of the fixed cam barrel 223. A follower pin 222b (see FIG. 6) of the moving cam barrel 222 engages with the cam groove 223a. Rectilinear movement regulating parts 221e (see FIG. 6) of the rectilinear guide barrel 221 engage with the linear guide grooves 223d1 and 223d2 so as to be movable in the optical axis direction. Moreover, a penetration cam 223b is formed in the fixed cam barrel 223 as a slit in the same locus as the cam groove 223a.

As shown in FIG. 8, drive grooves 224d prolonged in the optical axis direction are formed in the inner periphery of the drive barrel 224. The follower pins 222b of the moving cam barrel 222 engage with the drive grooves 224d so as to be movable. The object-side front ends (the top ends in FIG. 8) of the drive grooves 224d do not reach the object-side front end (the top end in FIG. 8) of the drive barrel 224. This prevents external stray light from entering from the object-side end of the drive barrel 224. Moreover, the moving amount of the moving cam barrel 222 in the optical axis direction is regulated by these drive grooves 224d. The follower pins 222b of the moving cam barrel 222 are arranged at positions at predetermined intervals from the penetration cam 223b of the fixed cam barrel 223 in the optical axis direction.

Accordingly, the moving cam barrel 222 moves in the optical axis direction while following the cam groove 223a of the fixed cam barrel 223 and rotating.

The rectilinear guide barrel 221 moves in the optical axis direction together with the moving cam barrel 222. The rotation of the rectilinear guide barrel 221 is regulated because the rectilinear movement regulating parts 221e fit into the linear guide grooves 223d1 and 223d2 of the fixed cam barrel 223 so as to be movable. This allows the rectilinear guide barrel 221 to move rectilinearly in the optical axis direction without rotating.

A gear part 224g (see FIG. 6) is formed on the outer periphery of the drive barrel 224. Furthermore, a fifth-group-driving cam groove 224a (see FIG. 6 and FIG. 8) is formed in the inner periphery of the drive barrel 224. A follower pin 218d (see FIG. 6) formed in the outer periphery of the fifth-lens-group holding member 218 engages with the fifth-group-driving cam groove 224a and follows. When the lens barrel 2 is in the collapsed position, a photographing position (a wide end), and a zoom end position (a telephoto end), the follower pin 218d moves to the collapsed position, photographing position, and zoom end position of the fifth-group-driving cam groove 224a, respectively, according to the rotation of the drive barrel 224, and moves the fifth lens group in the optical axis direction. As shown in FIG. 6 and FIG. 7, a through hole 223e prolonged in the optical axis direction is formed in the fixed cam barrel 223. The rotation of the fifth-lens-group holding member 218 is regulated because the follower pin 218d engages with the through hole 223e.

Moreover, as shown in FIG. 6 and FIG. 8, drive-barrel-driving cam grooves 224c are formed in the inner periphery of the drive barrel 224. Follower pins 223j formed in the outer periphery of the fixed cam barrel 223 engage with the drive-barrel-driving cam grooves 224c and follow. As shown in FIG. 8, the drive-barrel-driving cam groove 224c of the drive barrel 224 has two flat parts that are parallel to a rotation direction and differ in position in the optical axis direction and a lifting part that aslant connects the two flat parts. When the rotation of the drive barrel 224 moves the follower pin 223j of the fixed cam barrel 223 to the flat part that includes the photographing position and zoom end position from the other flat part that includes the collapsed position while following the drive-barrel-driving cam groove 224c, the drive barrel 224 moves to the object side in the optical axis direction.

Figure 9A:
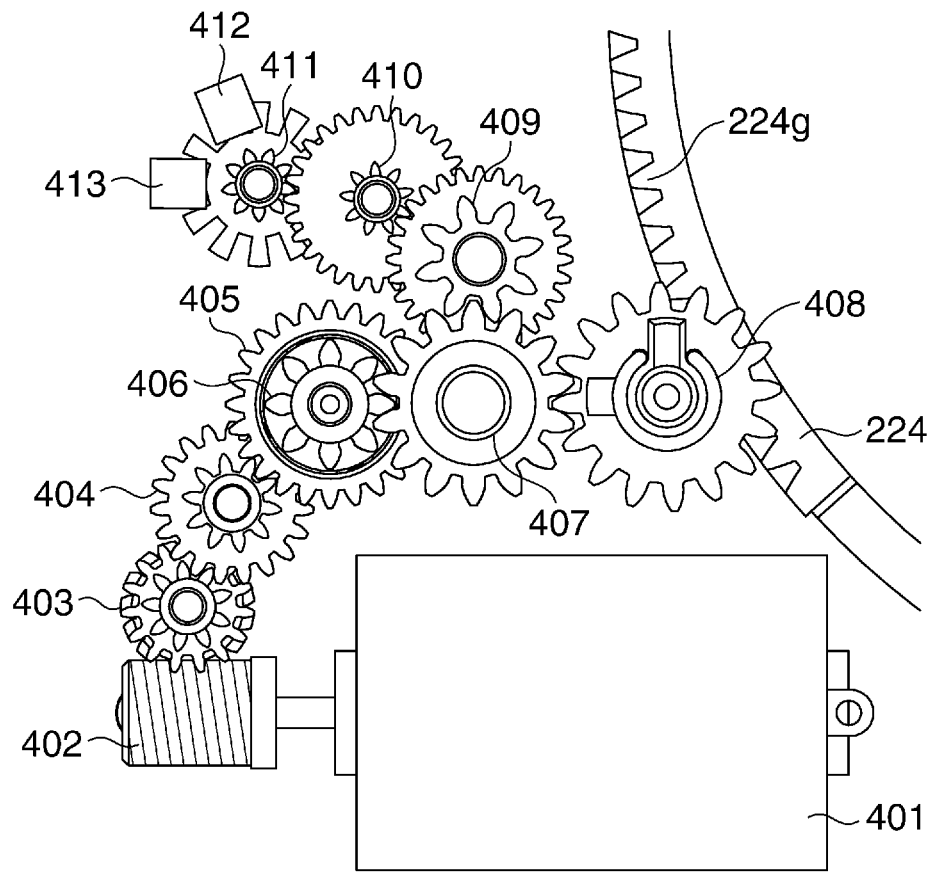
FIG. 9A is a view describing a transmission path of the driving force from a motor to the driving barrel in the lens barrel shown in FIG. 3B.
Figure 9B:
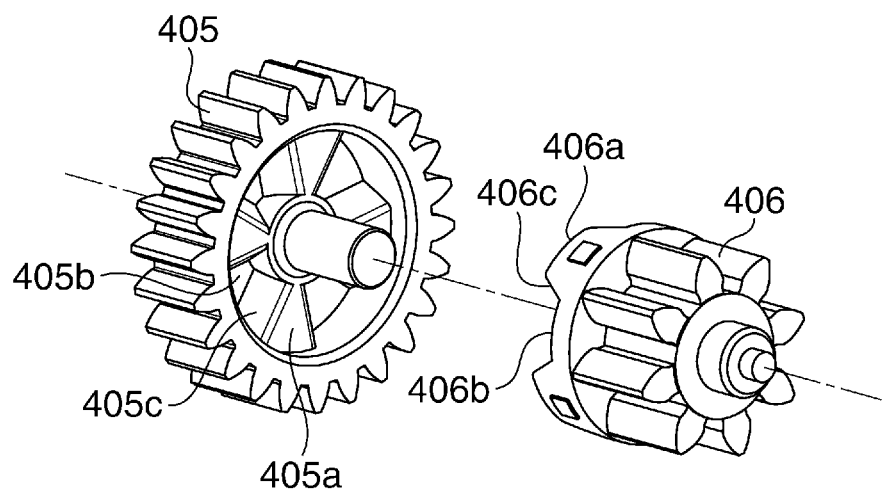
FIG. 9B is an exploded perspective view of a slip gear shown in FIG. 9A.

FIG. 9A is a view describing a transmission path of the driving force from the motor 401 to the driving barrel 224. FIG. 9B is an exploded perspective view of slip gears 405 and 406 shown in FIG. 9A.

As shown in FIG. 9A, the driving force of the motor 401 is slowed down and transferred from a gear (pinion) 402 attached to a drive shaft to the gear part 224g of the drive barrel 224 via a gear train including gears 403 through 408. Accordingly, the drive barrel 224 rotates and the lens barrel 2 is driven in the optical axis direction. The gear train including the gears 403 through 408 is equivalent to an example of the transfer mechanism of the present invention.

The gear train including the gears 402 through 408 has the slip gear 405 of large diameter as an input gear and the slip gear 406 of small diameter as an output gear. The slip gear 405 is supported so as to be movable against the slip gear 406 in the axial direction.

As shown in FIG. 9B, convex portions 405a and 406a and concave portions 405b and 406b of the same number are respectively formed in the contact surfaces of the slip gears 405 and 406. The convex portions 405a and 406a and the concave portions 405b and 406b are respectively connected by slant portions 405c and 406c. A gear connection switching mechanism (interruption mechanism) 3 drives the slip gear 405 with respect to the slip gear 406 in the axial direction. The rotation of the slip gear 405 is transferred to the slip gear 406 because the slant portions 405c and 406c mutually come in contact.

Moreover, the rotation of the gear 407 is transferred to a gear 411 through gears 409 and 410. The gear 411 is integrally formed with a disc that has a plurality of slits in the rotation direction, and the rotation amount of the drive barrel 224 is detected with photointerrupters 412 and 413 arranged across the disc.

Figure 10A:
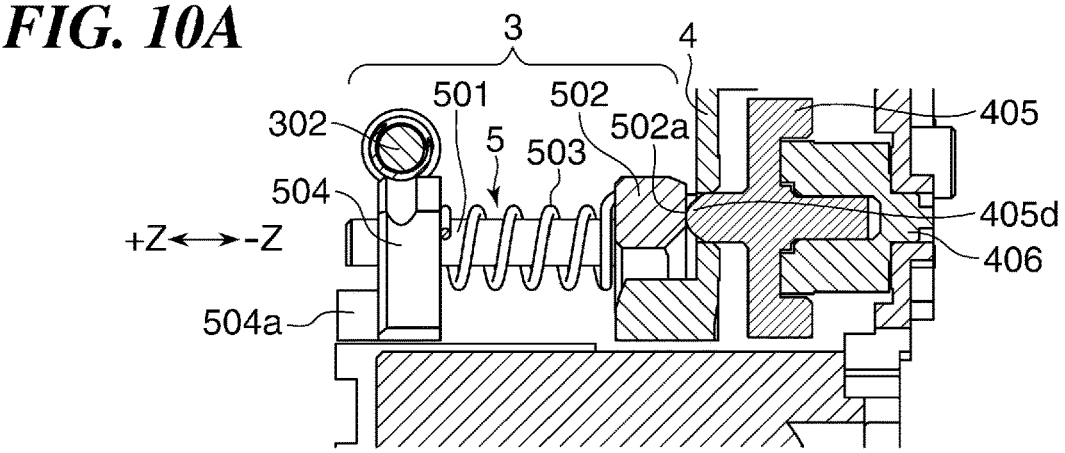
FIG. 10A is a sectional view showing a relationship between a gear connection switching mechanism and the slip gears of the lens barrel shown in FIG. 3B in an electric zoom drive state.
Figure 10B:
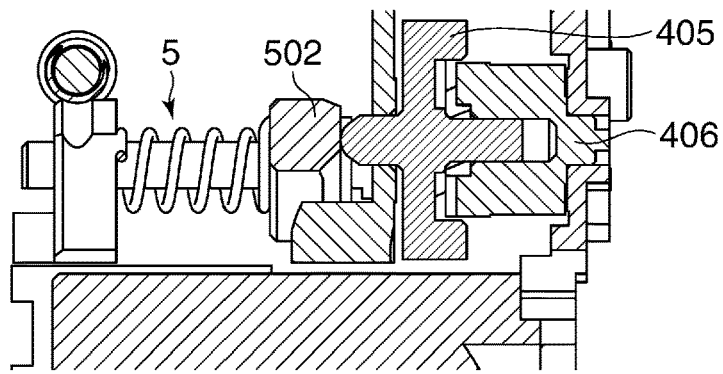
FIG. 10B is a sectional view showing an idling state of the slip gears shown in FIG. 10A.
Figure 10C:
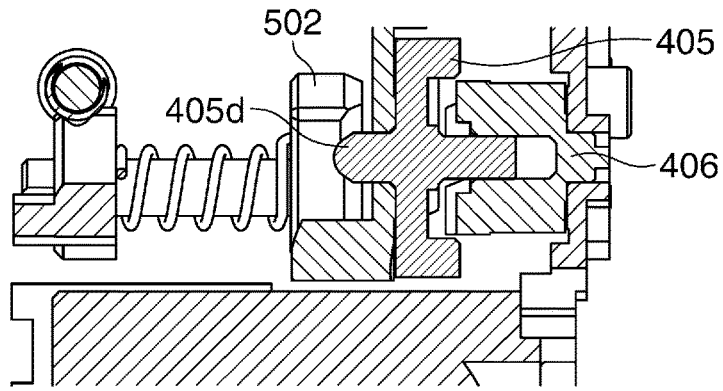
FIG. 10C is a sectional view showing the relationship between the gear connection switching mechanism and the slip gear of the lens barrel shown in FIG. 3B in a manual zoom drive state.
Figure 10D:
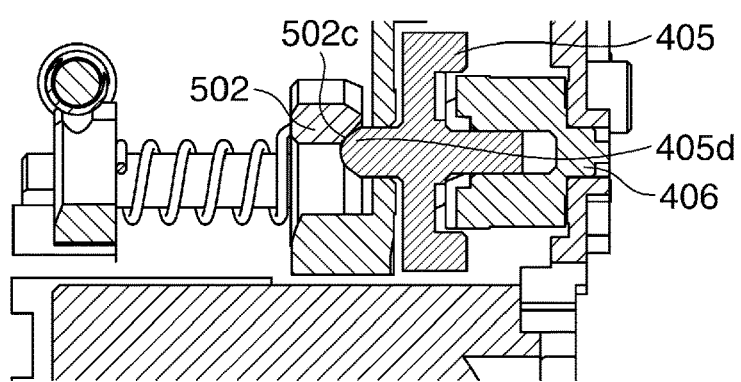
FIG. 10D is a sectional view showing a pressing start state of the slip gear when the manual zoom drive state shown in FIG. 10C is switched to the electric zoom drive state.

FIG. 10A is a sectional view showing a relationship between the gear connection switching mechanism 3 and the slip gears 405 and 406 in an electric zoom drive state. FIG. 10B is a sectional view showing an idling state of the slip gears in FIG. 10A. FIG. 10C is a sectional view showing the relationship between the gear connection switching mechanism 3 and the slip gears 405 and 406 in a manual zoom drive state. FIG. 10D is a sectional view showing a pressing start state of the slip gear when the manual zoom drive state is switched to the electric zoom drive state. It should be noted that the zoom drive state is switched between the manual state and electric state by transferring the operation of the switching member 102 shown in FIG. 1 to the gear connection switching mechanism 3. Concrete configuration for transferring will be described below with reference to FIG. 15A and FIG. 15B.

As shown in FIG. 10A, an energization projection 405d of the slip gear 405 comes in contact with a pressing surface 502a formed in a back-side lever 502 of an gear energization unit 5 in the electric zoom drive state. The back-side lever 502 is supported by a shaft 501 so as to be slidable in the axial direction (+−Z directions) using a front-side lever 504 as a fixed end under an energized condition toward the slip gear 406 (−Z direction) by an energization spring 503. In this state, since the slant portions 405c and 406c of the slip gears 405 and 406 mutually come in contact, the slip gears 405 and 406 rotate integrally. Accordingly, the driving force of the motor 401 is transferred to the gear part 224g of the drive barrel 224 via the gear train including the gears 403 through 408, and the electric zoom drive is available.

On the other hand, when the motor 401 is driven under the condition where the drive barrel 224 cannot rotate in the state in FIG. 10A, load is applied to the gear train including the gears 403 through 408. In this case, moving force in +Z direction occurs in the slip gear 405 against the slip gear 406 due to a wedge function of the slant portions 405c and 406c.

When the moving force in +Z direction of the slip gear 405 at this time becomes larger than the energizing force in −Z direction of the gear energization unit 5, the back-side lever 502 of the gear energization unit 5 moves in +Z direction as shown in FIG. 10B. Accordingly, since the engagement of the convex portions 405a and 406a against the concave portions 406b and 405b of the slip gears 405 and 406 is released, only the slip gear 405 races while the slip gear 406 stops. This removes the load occurred by the rotation of the motor 401.

When the load to the gear train including the gears 403 through 408 is removed, the slip gear 405 returns to the state shown in FIG. 10A again due to the energization force in −Z direction by the energization spring 503 of the gear energization unit 5, the convex portions 405a and 406a and the concave portions 406b and 405b of the slip gears 405 and 406 are engaged, and the slant portions 405c and 406c come in contact. When the motor 401 is continuously driven in the state where the drive barrel 224 cannot rotate, the state shown in FIG. 10A and the state shown in FIG. 10B are repeated alternately, and only the slip gear 405 continues racing.

When there is an obstacle to the extension of the lens barrel 2, for example, the drive barrel 224 cannot rotate. Even in such a case, breakage of a gear is prevented by racing the slip gear 405 as mentioned above.

Moreover, the front-side lever 504 and the back-side lever 502 rotate by a predetermined angle in the manual zoom drive state so that the pressing surface 502a of the back-side lever 502 does not come in contact with the energization projection 405d of the slip gear 405. Accordingly, the energization to the slip gear 405 by the gear energization unit 5 is released, and the slip gear 405 will be free in the axial direction. In this state, even if the drive barrel 224 is manually rotated and the gears 408, 407, and 406 rotate, the slip gear 405 separates from the slip gear 406 due to the wedge function of the slant portions 405c and 406c as shown in FIG. 10C, and the rotation is not transferred to the side of the motor 401.

As shown in FIG. 10C, this embodiment enables the manual zoom drive so that the drive barrel 224 is rotatable by external force other than the motor 401 by releasing the energization to the slip gear 405 with the gear energization unit 5. Moreover, when the slip gear 405 is energized by the gear energization unit 5 as shown in FIG. 10A, the regular electric zoom drive is available. It should be noted that the pushing start operation to the slip gear when the manual zoom drive state is switched to the electric zoom drive state shown in FIG. 10D will be described with reference to FIG. 15A and FIG. 15B.

Figure 11A:
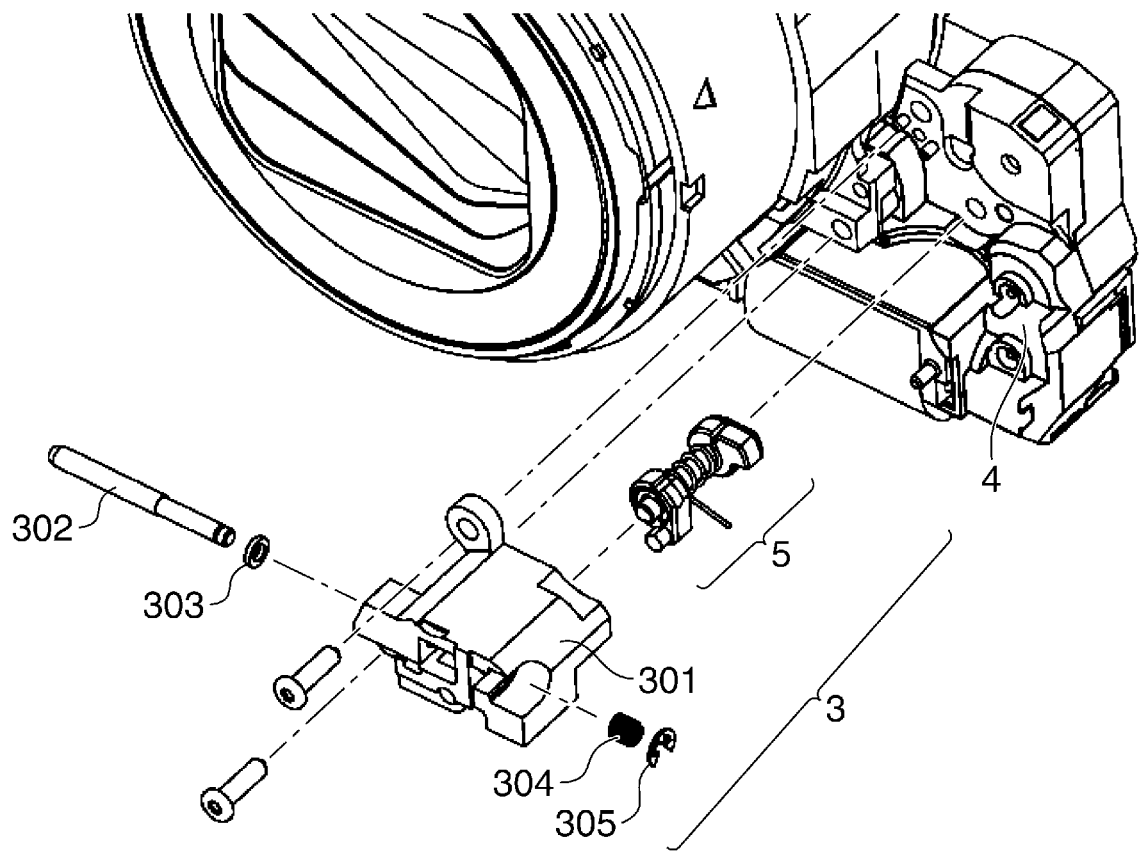
FIG. 11A is an exploded perspective view showing the gear connection switching mechanism attached to a gear box of the lens barrel shown in FIG. 3B.
Figure 11B:
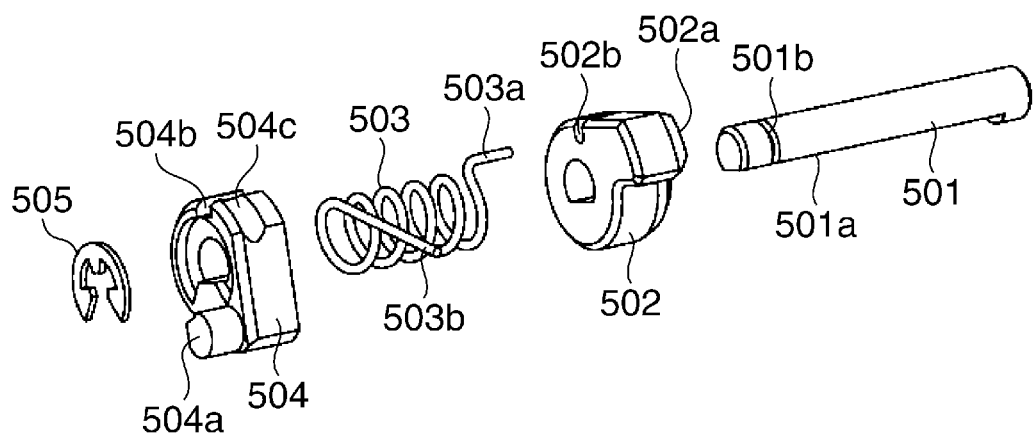
FIG. 11B is an exploded perspective view showing a gear energization unit that constitutes the gear connection switching mechanism shown in FIG. 11A.

FIG. 11A is an exploded perspective view showing the gear connection switching mechanism 3 attached to the gear box 4. FIG. 11B is an exploded perspective view showing the gear energization unit 5 that constitutes the gear connection switching mechanism 3 shown in FIG. 11A.

As shown in FIG. 11A, the gear connection switching mechanism 3 has the gear energization unit 5, a support member 301, a regulation shaft 302, a washer 303, a regulation-shaft energization spring 304, and an E-ring 305. The gear connection switching mechanism 3 is fixed to the front side of the gear box 4 with screws etc.

As shown in FIG. 11B, the gear energization unit 5 has the shaft 501, the back-side lever 502, the energization spring 503, and the front-side lever 504. The gear energization unit 5 is formed as a unit by fixing with an E-ring 505 after assembling. A D-cut portion 501a is formed in the shaft 501 except for the right end in FIG. 11B.

The back-side lever 502, energization spring 503, and front-side lever 504 are fit to the D-cut portion 501a in order in the axial direction. Then, the E-ring 505 is attached to a shaft groove portion 501b while pushing the front-side lever 504 so that the energization spring 503 is compressed by a predetermined amount. Accordingly, the back-side lever 502 is supported so as to be slidable in the axial direction of the shaft 501 against the energization force of the energization spring 503 using the front-side lever 504 as a fixed end. In this supporting state, the front-side lever 504 and back-side lever 502 that have D-shaped through holes that engage with the D-cut portion 501a rotate in the same phase.

A contact portion 504a is formed in the object side surface of the front-side lever 504. The contact portion 504a is projected in the axial direction form a position decentered from the center. A groove portion 504b prolonged in the axial direction and a concave portion 504c prolonged in the circumferential direction are formed in the outer circumferential surface of the front-side lever 504. The concave portion 504c is shallower than the groove portion 504b.

The energization spring 503 gives the energization force in the axial direction to the slip gear 405 as mentioned above. Moreover, one end 503a (see FIG. 11B) of the energization spring 503 is inserted into the groove portion 502b formed in the back-side lever 502, and the other end 503b comes in contact with the front-side lever 504. Accordingly, the energization spring 503 generates charging force in a twisting direction, and the gear energization unit 5 is energized in the rotation direction.

Figure 12A:
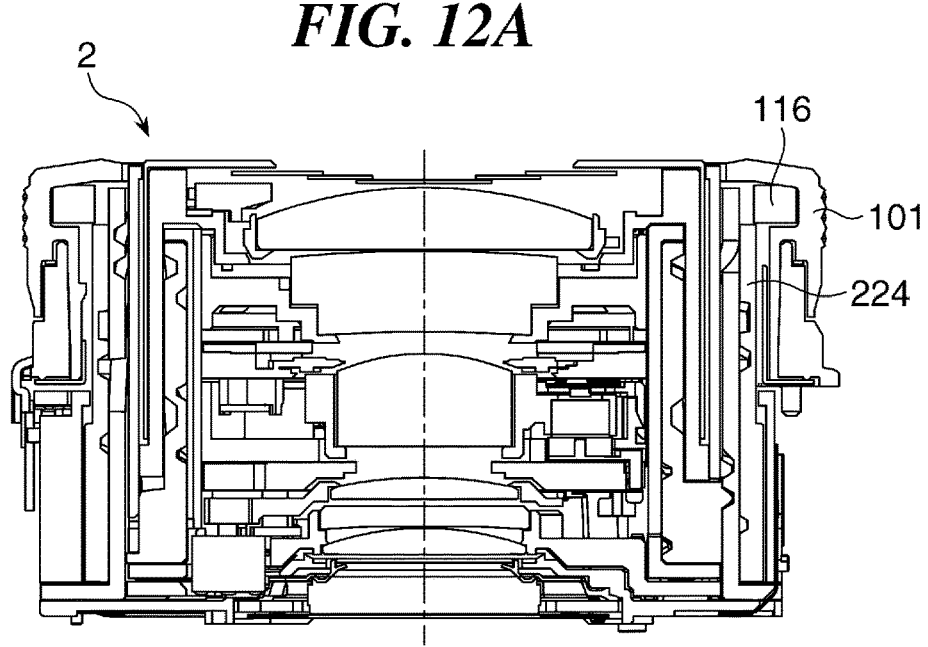
FIG. 12A is a sectional view showing the lens barrel and a zoom operation ring shown in FIG. 2 in the collapsed position.
Figure 12B:
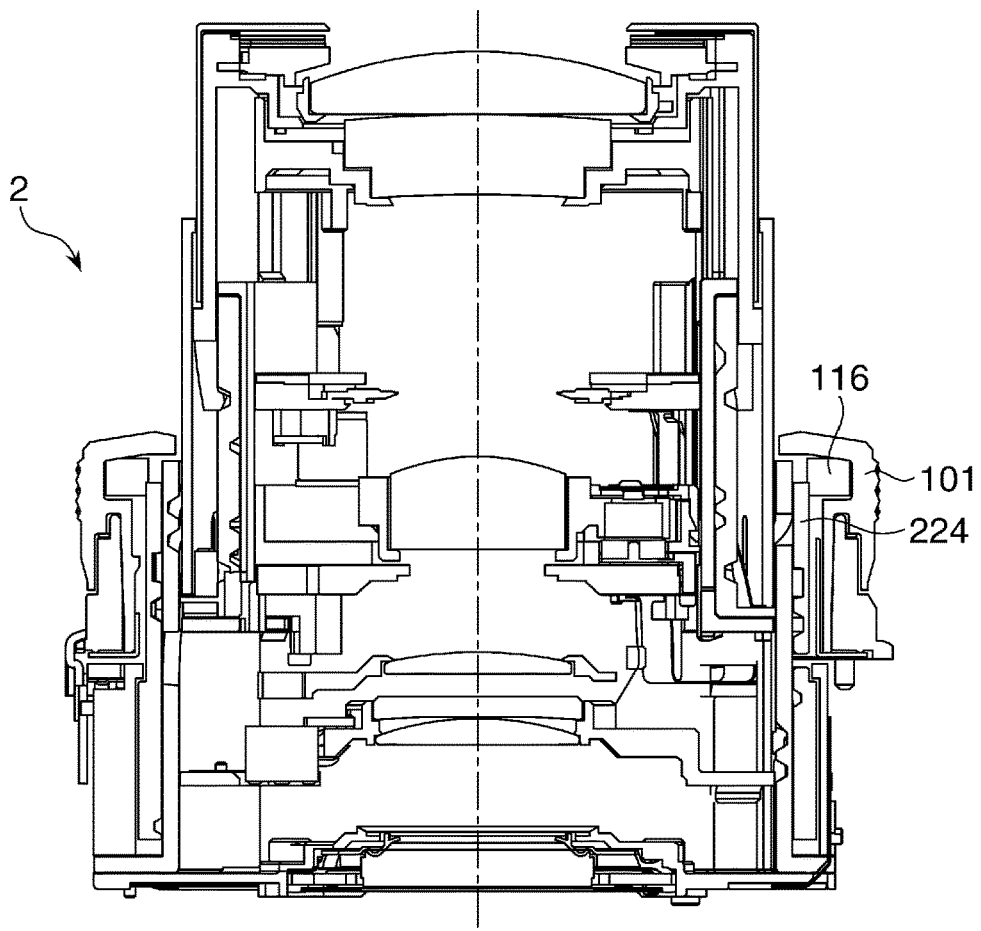
FIG. 12B is a sectional view showing the zoom operation ring and lens barrel shown in FIG. 12A in the photographing position (extended position).

Next, the behavior of the drive barrel 224 according to the manual zoom operation will be described with reference to FIG. 12. FIG. 12A is a sectional view showing the zoom operation ring 101 and lens barrel 2 in the collapsed position. FIG. 12B is a sectional view showing the zoom operation ring 101 and the lens barrel 2 in the photographing position (extended position).

In the state shown in FIG. 12A, the drive barrel 224 of the lens barrel 2 is apart from the elastic member 116 that is fixed to the inner periphery of the zoom operation ring 101 in the axial direction. Accordingly, even if the zoom operation ring 101 is rotationally operated, the rotation is not transferred to the drive barrel 224, and the lens barrel 2 does not extend. In this embodiment, since an extending operation of the lens barrel 2 to the photographing position from the collapsed position and a retracting operation to the collapsed position from the photographing position are performed by the electric zoom drive, the rotation of the zoom operation ring 101 is prevented from transferring to the drive barrel 224.

Moreover, since increased load to the drive barrel 224 (lens barrel 2) due to the elastic member 116 is avoided, the smooth extending operation of the lens barrel 2 by the electric zoom drive is available, which avoids increasing the driving current for extending or retracting the lens barrel 2. Furthermore, since the elastic member 116 does not come in contact with the drive barrel 224 in the collapsed position of the lens barrel 2, degradation of the elastic member 116 is reduced even in a case of long-term neglect under a high-temperature and high-humidity condition.

In the state shows in FIG. 12B, the drive barrel 224 is moved to the object side in the optical axis direction according to the extending operation of the lens barrel 2. Accordingly, since the elastic member 116 fixed to the inner periphery of the zoom operation ring 101 engages with the drive barrel 224 in the optical axis direction, the rotation of the zoom operation ring 101 is able to be transferred to the drive barrel 224. This enables the manual zoom drive because the rotary operation of the zoom operation ring 101 is transferred to the drive barrel 224 and the lens groups for varying the magnification are moved in the optical axis direction.

Figure 13A:
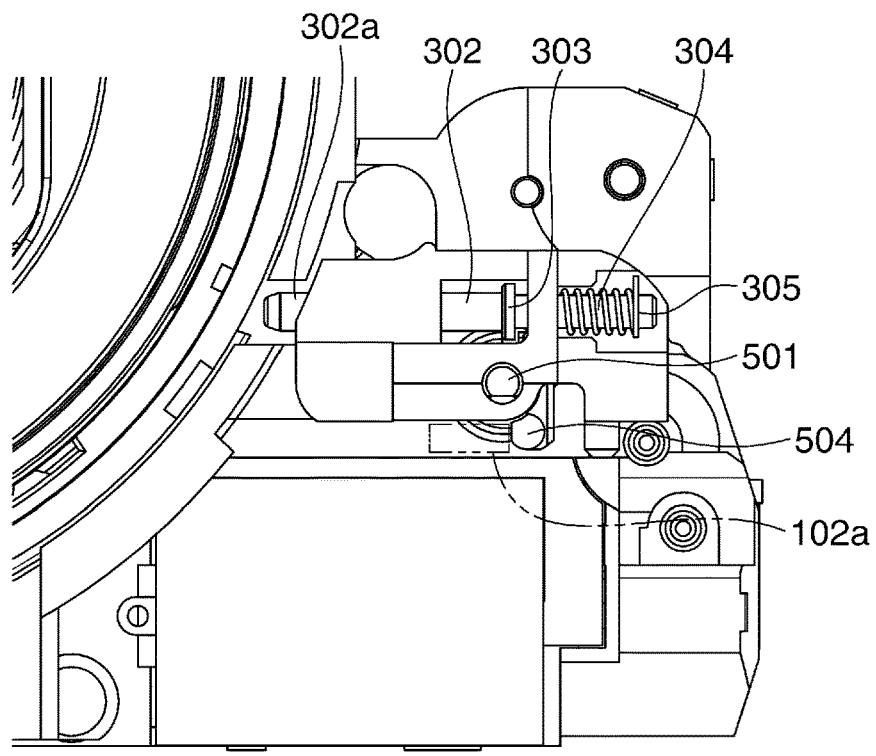
FIG. 13A is a front view describing operations of the gear energization unit and a regulation shaft when the switching member shown in FIG. 1A is operated to the electric zoom drive.
Figure 13B:
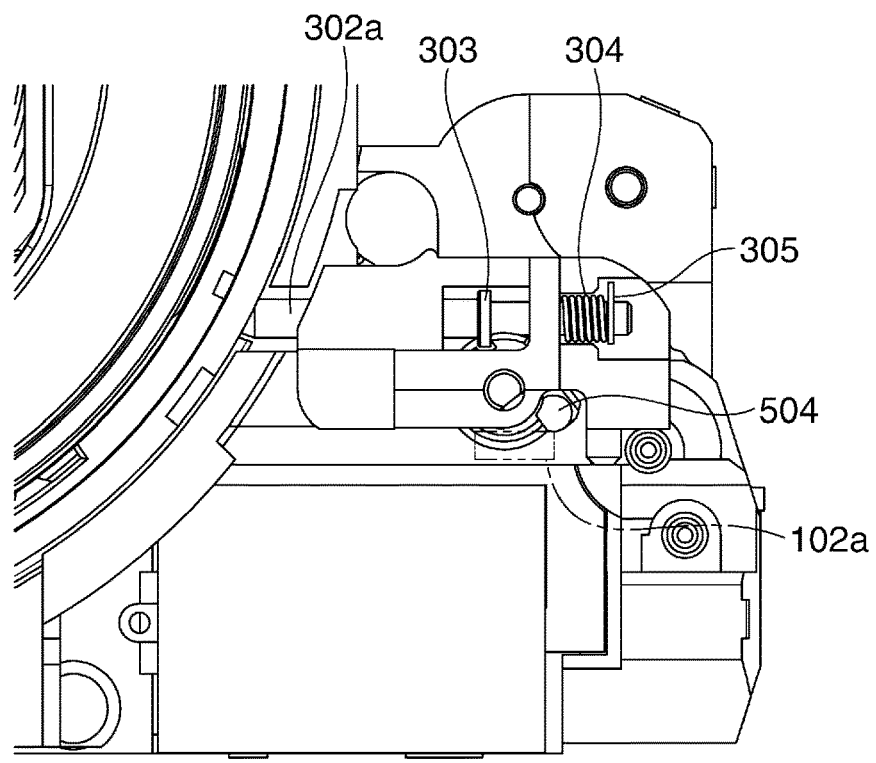
FIG. 13B is a front view describing operations of the gear energization unit and the regulation shaft when the switching member is operated to the manual zoom drive.

Next, the operation of the gear connection switching mechanism 3 will be described with reference to FIG. 13A through FIG. 15B. FIG. 13A is a front view describing operations of the gear energization unit 5 and the regulation shaft 302 when the switching member 102 is operated to the electric zoom drive. FIG. 13B is a front view describing operations of the gear energization unit 5 and the regulation shaft 302 when the switching member is operated to the manual zoom drive.

The regulation shaft 302 moves in the axial direction in interlocked with the rotational operation of the front-side lever 504 around the axis of the shaft 501. Then, the regulation shaft 302 moves so that a drive-barrel-regulating portion 302a is away from the lens barrel 2 (FIG. 13A) in the electric zoom drive. The regulation shaft 302 moves so that the drive-barrel-regulating portion 302a comes near the lens barrel 2 (FIG. 13B) in the manual zoom drive. Accordingly, the rotation range of the drive barrel 224 is restricted.

Figure 14A:
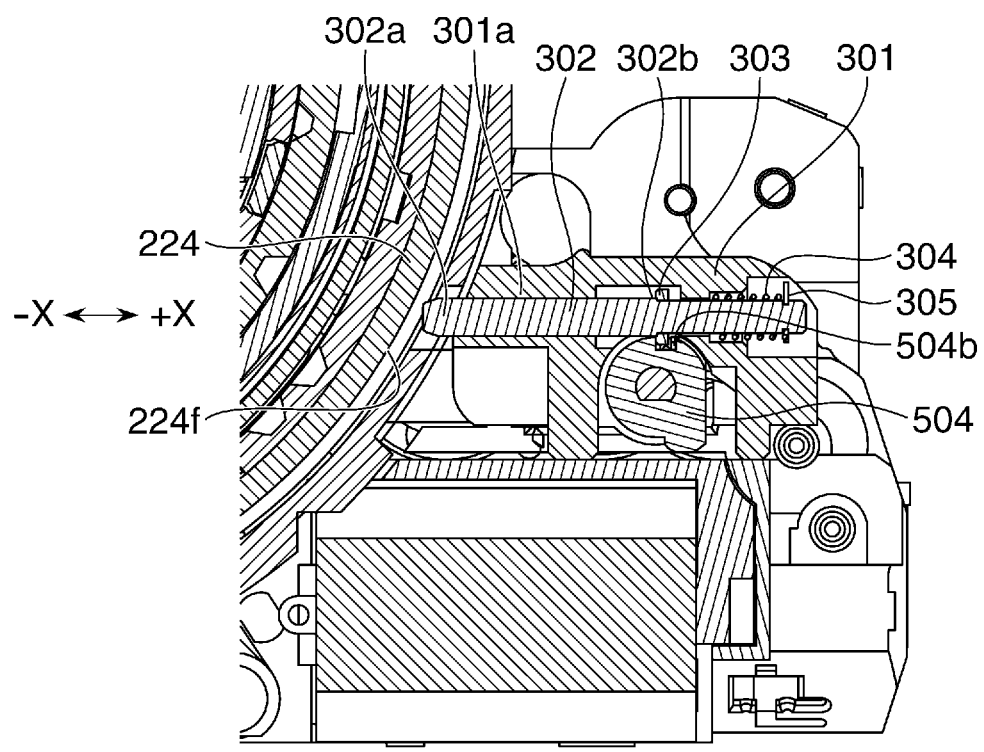
FIG. 14A is a sectional view describing the operations of the gear energization unit and the regulation shaft when the switching member shown in FIG. 1A is operated to the electric zoom drive.
Figure 14B:
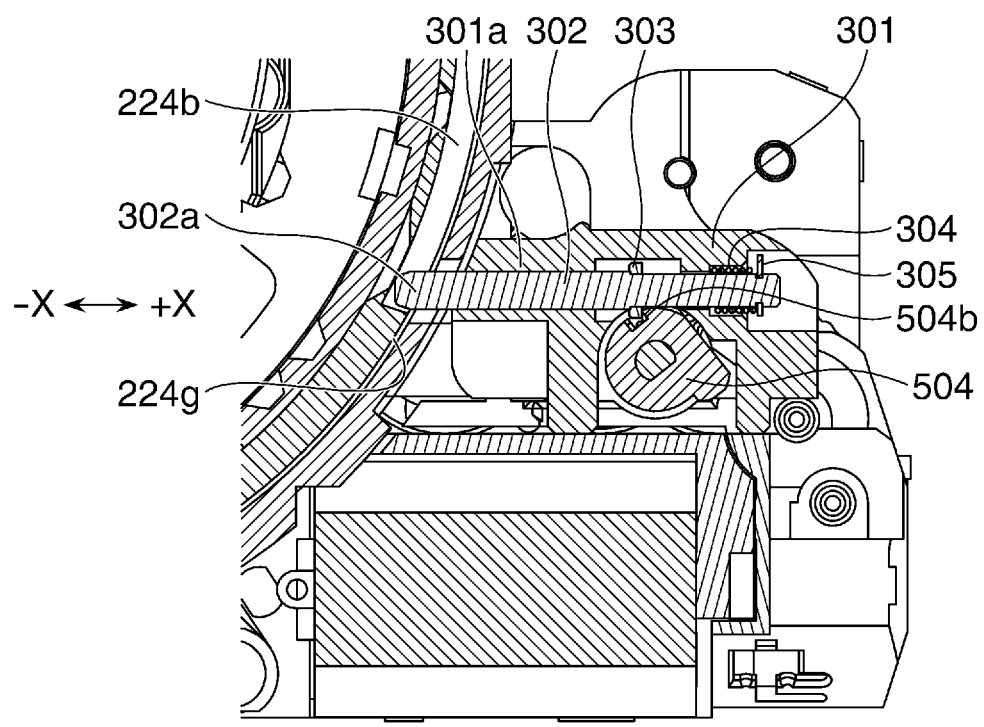
FIG. 14B is a sectional view describing the operations of the gear energization unit and the regulation shaft when the switching member is operated to the manual zoom drive.

FIG. 14A is a sectional view describing operations of the gear energization unit 5 and the regulation shaft 302 when the switching member 102 is operated to the electric zoom drive. FIG. 14B is a sectional view describing operations of the gear energization unit 5 and the regulation shaft 302 when the switching member 102 is operated to the manual zoom drive.

As shown in FIG. 14A, the washer 303 is locked by a stepped section 302b formed around the regulation shaft 302, and the peripheral edge of the washer 303 engages with the groove portion 504b of the front-side lever 504. Accordingly, when the front-side lever 504 rotates interlocked with the operation of the switching member 102, the regulation shaft 302 slides in ±X directions along a guide hole 301a of the support member 301 against the drive barrel 224.

At the time of start-up of the camera or at the time of the electric zoom drive shown in FIG. 14A, when the lens barrel 2 is in the collapsed position, the drive-barrel-regulating portion 302a of the regulation shaft 302 is apart from the drive barrel 224, and the rotation range of the drive barrel 224 is not regulated. The energization spring 304 and E-ring 305 are attached to the regulation shaft 302. The energization spring 304 is nipped between the support member 301 that is a fixed end and the E-ring 305 in an energized state. The energization force acts in the +X direction in FIG. 14A so as not to regulate the rotation range of the drive barrel 224.

At the time of the manual zoom drive shown in FIG. 14B, since the drive-barrel-regulating portion 302a of the regulation shaft 302 is fitted into an engaging groove 224b formed in the drive barrel 224, the rotation range of the drive barrel 224 is restricted within a range of the engaging groove 224b. The engaging groove 224b is formed so as to prevent the lens barrel 2 from retracting to the collapsed position from the photographing position, and the engagement (FIG. 12B) of the elastic member 116 with the drive barrel 224 is guaranteed within the rotation range. Accordingly, a user is able to perform the manual zoom drive within the range in which the zoom operation is available without considering the rotation range of the drive barrel 224.

Figure 15A:
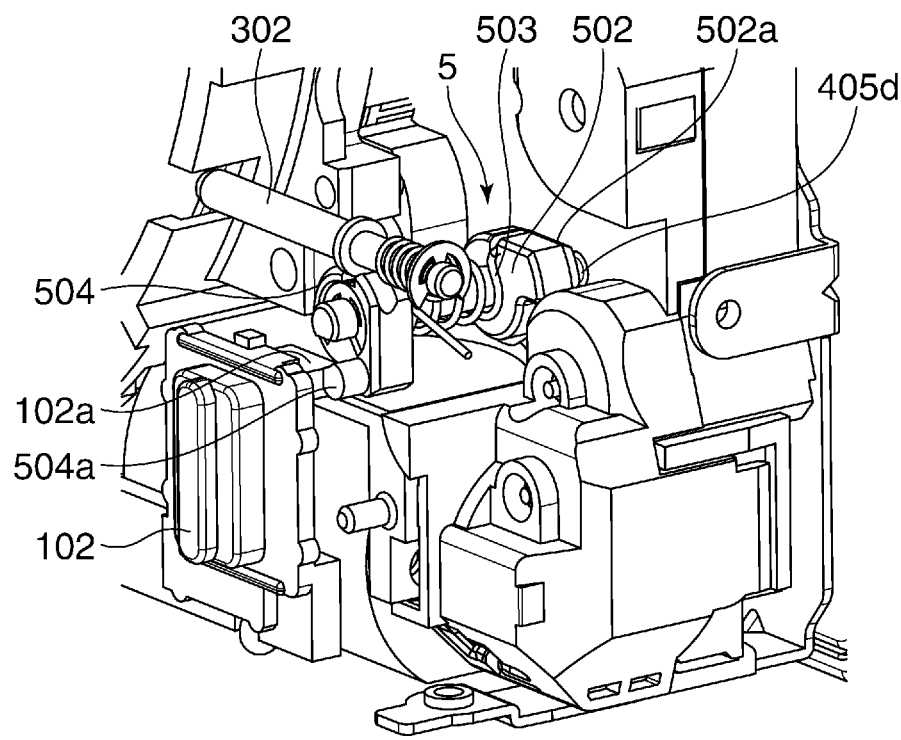
FIG. 15A is a perspective view describing the actions of the gear energization unit and the regulation shaft when the switching member shown in FIG. 1A is operated to the electric zoom drive.
Figure 15B:
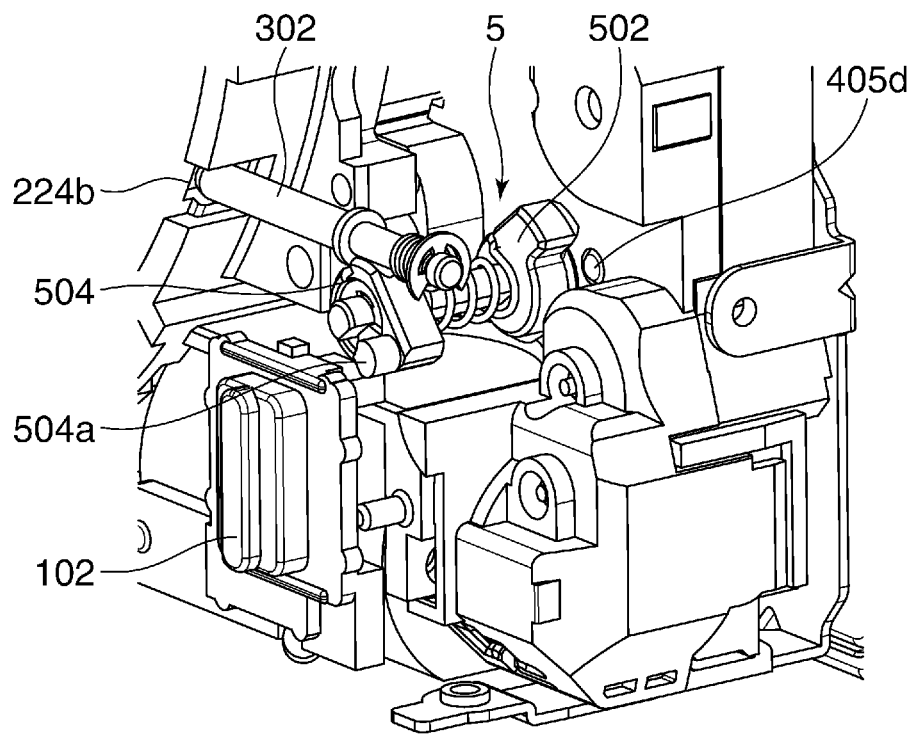
FIG. 15B is a perspective view describing the operations of the gear energization unit and the regulation shaft when the switching member is operated to the manual zoom drive.

FIG. 15A is a perspective view describing operations of the gear energization unit 5 and the regulation shaft 302 when the switching member 102 is operated to the electric zoom drive. FIG. 15B is a perspective view describing operations of the gear energization unit 5 and the regulation shaft 302 when the switching member 102 is operated to the manual zoom drive.

The switching member 102 is provided in the front of the storage portion of the motor 401 so as to be slidable. A projection 102a that slides along the upper surface of the storage portion is integrally formed at the back side of the switching member 102. The projection 102a comes in contact with the contact portion 504a formed in the front-side lever 504 of the gear energization unit 5, and the slide of the switching member 102 is transferred as the rotation of the gear energization unit 5. The gear energization unit 5 is energized in the clockwise direction in FIG. 15A by the energization force of the energization spring 503 and regulation-shaft energization spring 304. Accordingly, the contact portion 504a always comes in contact with the projection 102a.

In the state shown in FIG. 15A, the pressing surface 502a of the back-side lever 502 comes in contact with the front end of the energization projection 405d of the slip gear 405 as the input gear. The energization force of the energization spring 503 is applied in the direction that the pressing surface 502a presses down the energization projection 405d. Accordingly, the convex parts 405a and 406a and the concave portions 406b and 405b of the slip gears 405 and 406 are engaged as shown in FIG. 10A, which enables the electric zoom drive by the motor 401.

In the state shown in FIG. 15B, the contact portion 504a of the front-side lever 504 is pushed by the projection 102a of the switching member 102 that is operated to slide in the rightward direction in the drawing, and the gear energization unit 5 rotates in the counterclockwise direction around the shaft 501. Accordingly, the pressing operation by the pressing surface 502a of the back-side lever 502 to the energization projection 405d of the slip gear 405 is released as shown in FIG. 10C. In this state, the rotation transmission path from the motor 401 to the drive barrel 224 is intercepted, and the manual zoom drive by the rotary operation of the zoom operation ring 101 becomes available.

As shown in FIG. 15A and FIG. 15B, the contact portion 504a of the front-side lever 504 is in contact with the projection 102a of the switching member 102 in both of the electric zoom drive and manual zoom drive. Accordingly, backlash of the switching member 102 is eliminated.

The operation amount of the switching member 102 is determined on the basis of the required rotational amount of the back-side lever 502 and the depth of the engaging groove 224b of the drive barrel 224. That is, when the lens barrel 2 is in the collapsed position and when the electric zoom drive is selected as shown in FIG. 15A and FIG. 14A, the engaging groove 224b is not located at the position facing to the regulation shaft 302, and the regulation shaft 302 faces an outer circumferential surface 224f of the drive barrel 224. Then, when the regulation shaft 302 comes in contact with the outer circumferential surface of the drive barrel 224, the movement of the regulation shaft 302 is regulated, and the operation toward the manual zoom drive of the switching member 102 connected to the regulation shaft 302 via the front-side lever 504 is also regulated. Accordingly, the camera always starts up by the electric zoom drive, and an operation mistake is prevented.

In the first embodiment, since the range of the engaging groove 224b of the drive barrel 224 in the rotation direction is defined between a wide end and a telephoto of optical zoom, the switching member 102 cannot be switched to the manual zoom drive when the lens barrel 2 is in the collapsed position. Accordingly, when the power is turned ON, the extending operation of the lens barrel 2 is certainly performed electrically, which shortens the time required to reach the photographing position as compared with a case where the extending operation is performed manually.

Moreover, when the switching member 102 is switched to the electric zoom drive from the manual zoom drive, the back-side lever 502 rotates while pushing down the energization projection 405d of the slip gear 405 because the gear energization unit 5 is always energized by the energization spring 503 in the clockwise direction in FIG. 15A. As shown in FIG. 10D, a slope is formed in the energization projection 405d of the slip gear 405, and a slope 502c is formed also in the back-side lever 502 at the opposite side. This facilitates the pushing-down of the energization projection 405d by the back-side lever 502, and enables the slip gear 405 to engage with the slip gear 406 in a state where the phases are matched.

The mechanism that pushes down the slip gear 405 by the rotation of the back-side lever 502 using the slopes miniaturizes and thins the camera by simplifying the mechanism and by saving the space, as compared with a mechanism that pushes the slip gear 405 in the axial direction.

As described above, in the first embodiment, while the lens barrel 2 is electrically shifted to a photographing area from the collapsed position in a non-photographing area, the drive barrel 224 of the lens barrel 2 engages with the elastic member 116 on the inner periphery of the zoom operation ring 101. This enables to transfer the rotation of the zoom operation ring 101 to the drive barrel 224 via the elastic member 116, and enables to perform the electric zoom drive or the manual zoom drive by operating the switching member 102 in this state.

Accordingly, the manual zoom drive and electric zoom drive are switched with the simple mechanism, which enables to miniaturize and thin the camera 1 in addition to the lens barrel 2. Moreover, since the rotation of the zoom operation ring 101 is transferred to the drive barrel 224 via the elastic member 116, generation of time lag between a rotary operation of the zoom operation ring 101 and lens drive is prevented.

Figure 16:
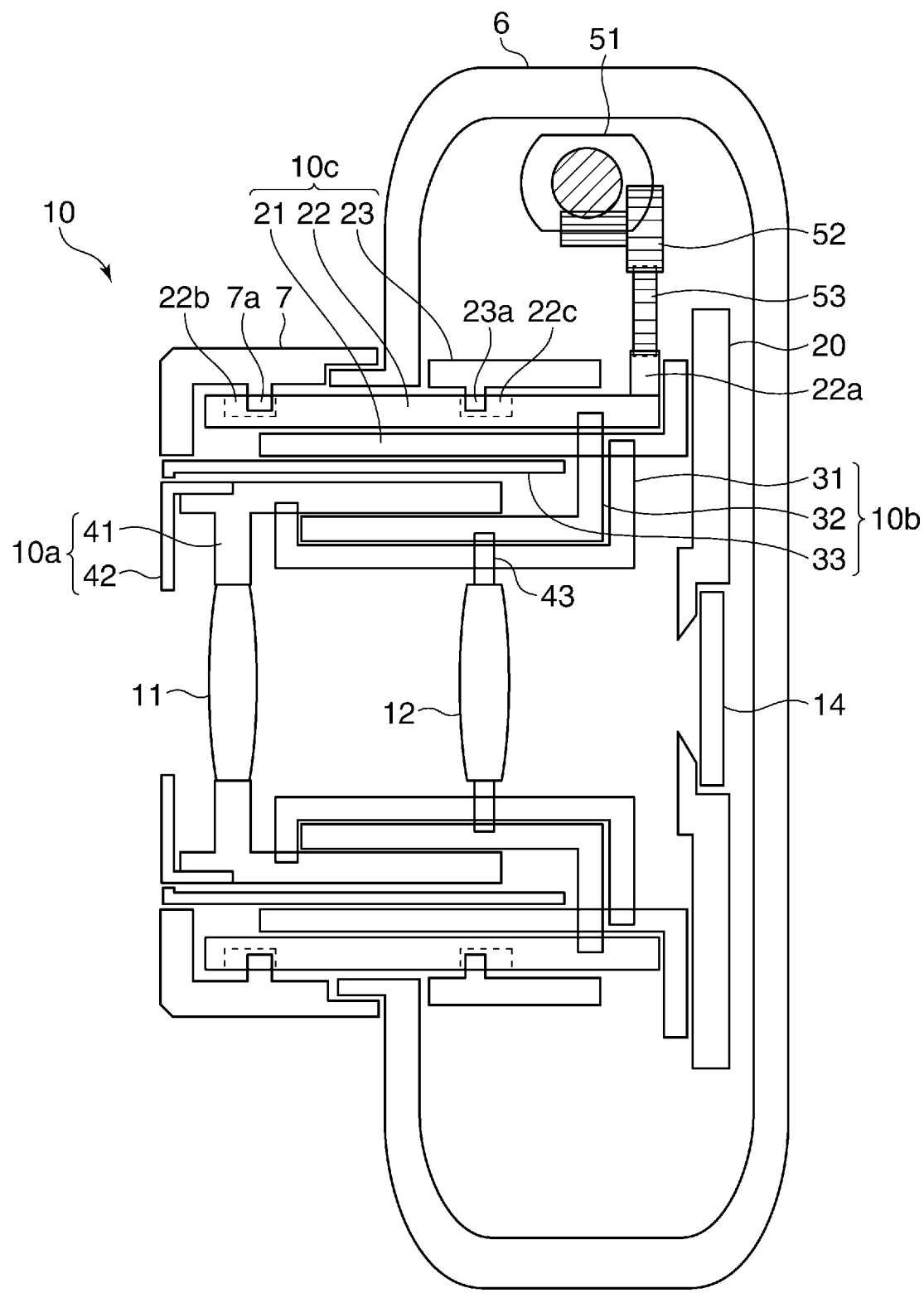
FIG. 16 is a sectional view schematically showing a state where a lens barrel of a digital camera as a second embodiment of the image pickup apparatus equipped with the lens driving device of the present invention is in the collapsed position.
Figure 17:
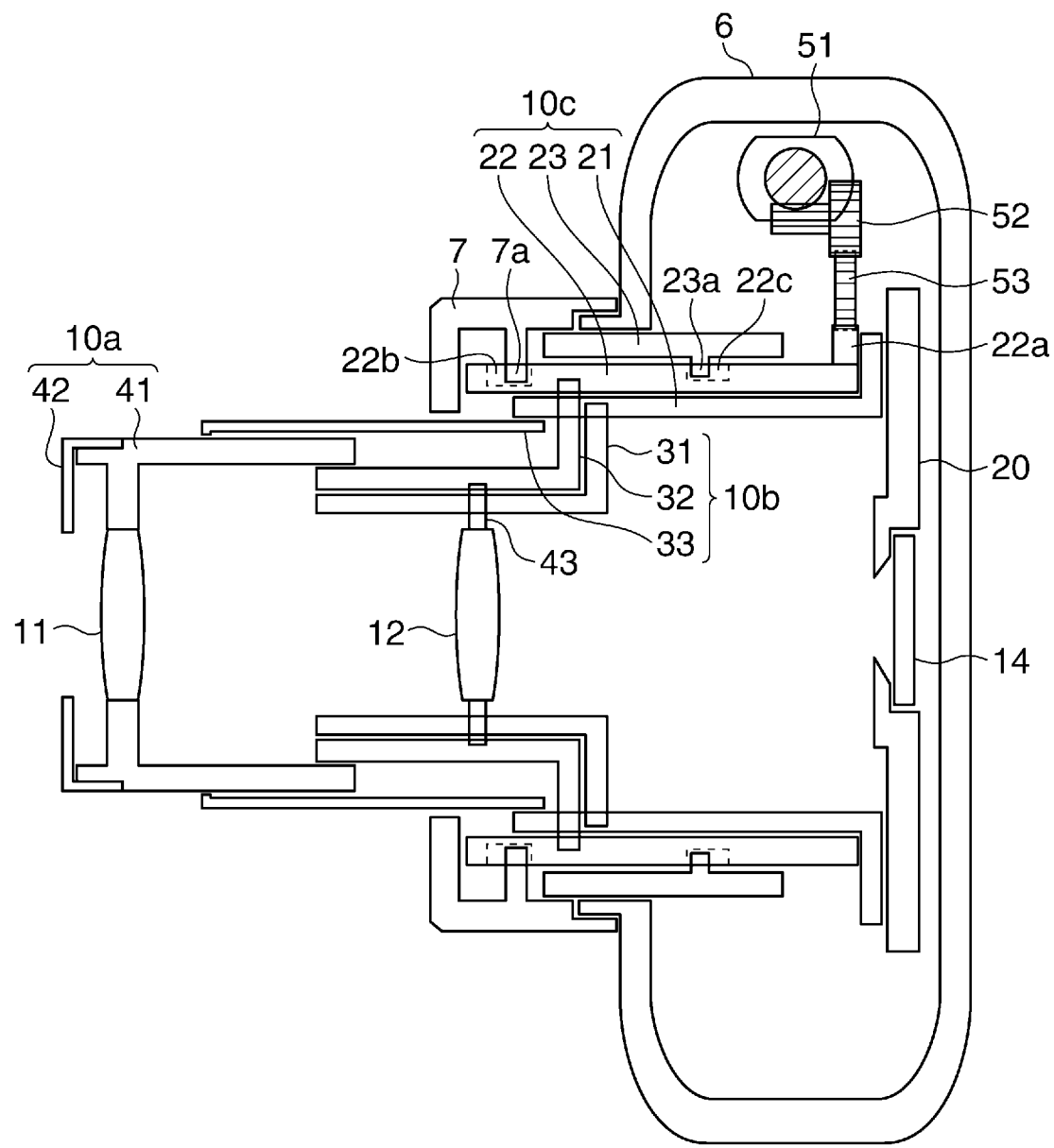
FIG. 17 is a sectional view schematically showing a state where the lens barrel of the digital camera shown in FIG. 16 is in the photographing position.

FIG. 16 is a sectional view schematically showing a state where a lens barrel of a digital camera as a second embodiment of an image pickup apparatus equipped with a lens driving device of the present invention is in a collapsed position. FIG. 17 is a sectional view schematically showing a state where the lens barrel of the digital camera shown in FIG. 16 is in a photographing position.

The digital camera of the second embodiment is constituted by mounting the lens barrel 10 in the front side (object side) of a camera body 6. As shown in FIG. 16 and FIG. 17, the lens barrel 10 includes a zoom lens that changes photographing magnification by moving a plurality of lenses 11 and 12 in an optical axis direction. The lenses 11 and 12 constitute a photographing optical system. The lens barrel 10 is provided with a first group barrel unit 10a, an intermediate barrel unit 10b, and a fixed barrel unit 10c.

An image pickup device 14 is held by a sensor holder 20 in the camera body 6 at a rear side of the lens barrel 10. An image is formed on the image pickup device 14 by an object light flux passing through the lenses 11 and 12. Moreover, an operation ring 7 is provided around a front end of the lens barrel 10 so as to allow a rotary operation and a movement in the optical axis direction. A plurality of pins 7a that are projected inwardly in the radial direction are formed on the inner periphery of the operation ring 7 at nearly regular intervals in the circumferential direction. It should be noted that detailed members, such as cam grooves and cam followers that move the lenses 11 and 12 in the optical axis direction, a shutter device, and a focusing lens, are omitted in FIG. 16 and FIG. 17.

The first group barrel unit 10a has a first group holder 41 holding the first lens 11, and a decorative cap 42. The intermediate barrel unit 10b has an inside rectilinear barrel 31, a rotating cam barrel 32, and an inner cover barrel 33. The second group holder 43 holding the second lens 12 is provided inside the rotating cam barrel 32. The fixed barrel unit 10c has a fixed barrel 21, a drive barrel 22, and an outside cover barrel 23. The outside cover barrel 23 is equivalent to an example of the barrel member of the present invention. The outside cover barrel 23 is fixed to the fixed barrel 21. A plurality of convex parts 23a that are projected inwardly in the radial direction are formed on the inner periphery of the outside cover barrel 23.

A gear part 22a is provided in the drive barrel 22, and driving force of a motor 51 is transferred to the gear part 22a through a gear train including gears 52 and 53. Accordingly, the drive barrel 22 is rotated, and the rotation of the drive barrel 22 is transferred to the rotating cam barrel 32 that cam-engages with the drive barrel 22. Accordingly, the second group holder 43 moves in the optical axis direction together with the rotating cam barrel 32 and the inside rectilinear barrel 31 while the rotation of the second group holder 43 is regulated by the inside rectilinear barrel 31. The first group holder 41 that cam-engages with the inside rectilinear barrel 31 also moves in the optical axis direction while the rotation is regulated in the same manner. Pin engagement portions 22b and a bayonet engaging groove 22c are formed in the outer periphery of the drive barrel 22. The pins 7a of the operation ring 7 engage with the pin engagement portion 22b. The convex parts 23a of the outside cover barrel 23 engage with the bayonet engaging groove 22c.

Figure 18:
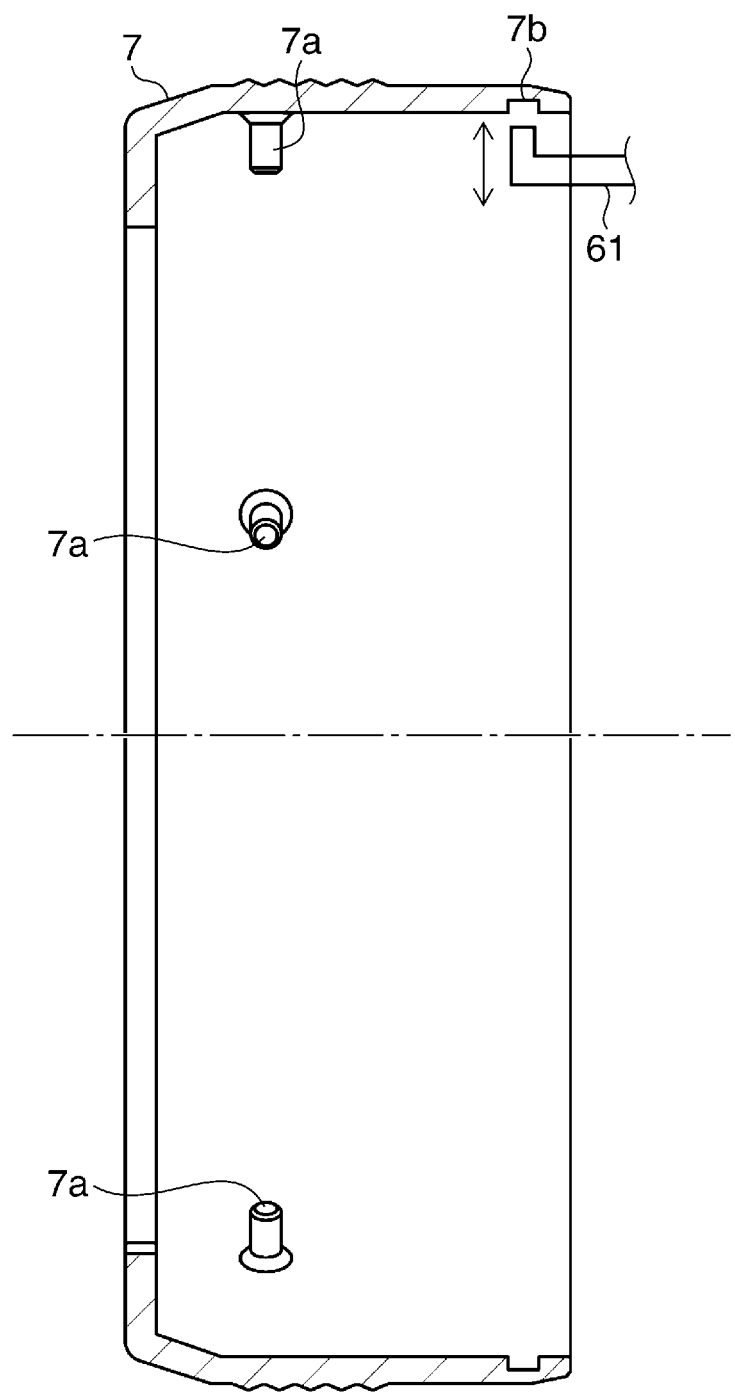
FIG. 18 is a sectional view showing an operation ring of the digital camera shown in FIG. 16.
Figure 19:
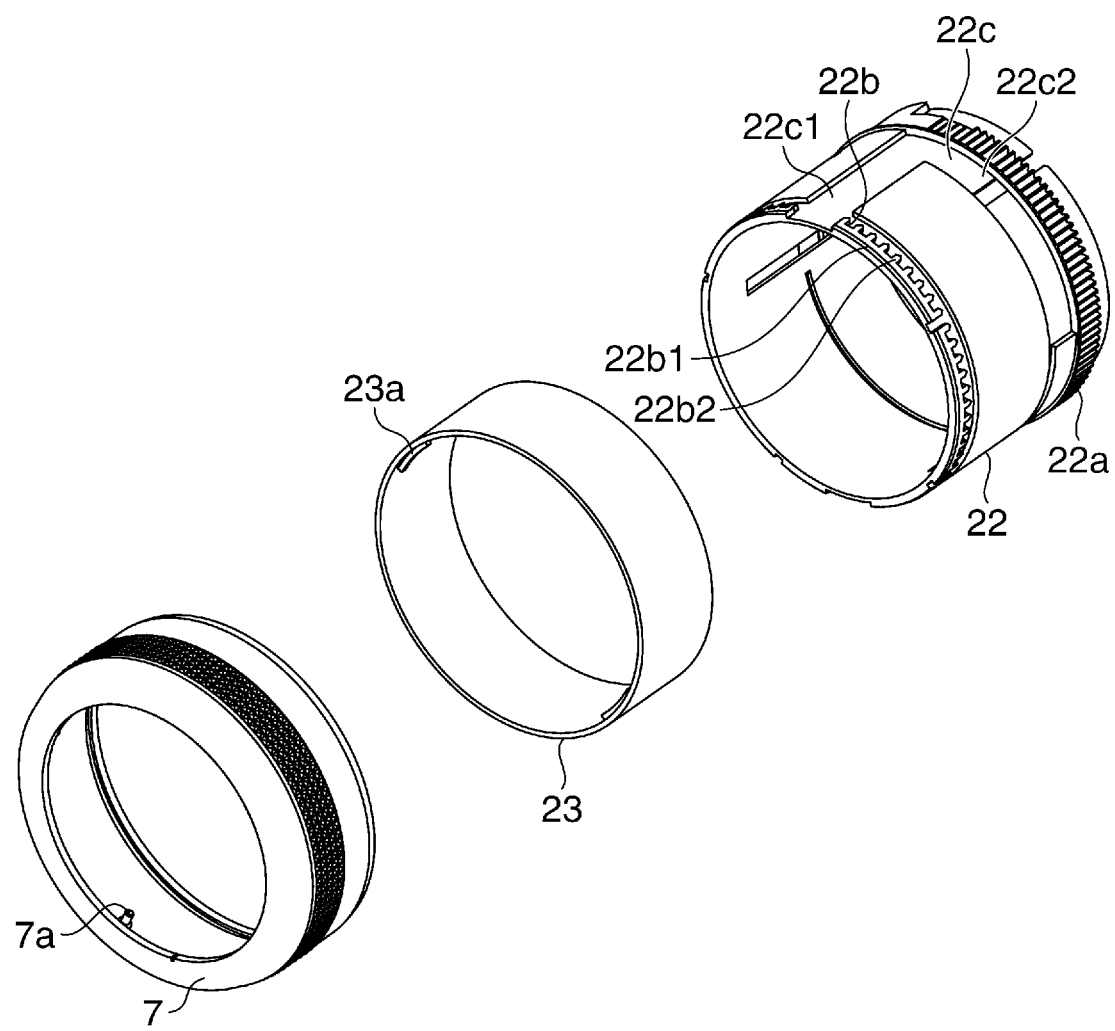
FIG. 19 is an exploded perspective view showing the operation ring, a drive barrel, and an outside cover barrel of the digital camera shown in FIG. 16.

FIG. 18 is a sectional view showing the operation ring 7. FIG. 19 is an exploded perspective view showing the operation ring 7, the drive barrel 22, and the outside cover barrel 23.

Although the groove portion 2b formed in the inner periphery of the operation ring 7 in the circumferential direction and a locking lever 61 that is provided in the camera body 6 and engages with the groove portion 2b are described in FIG. 18, these are mechanisms needed in a third embodiment mentioned later, and these are not indispensable in the second embodiment.

When the locking lever 61 engages with the groove portion 2b, the position of the operation ring 7 in the optical axis direction is regulated at the position for electric zoom. The locking lever 61 is provided in the inner periphery of the operation ring 7 so as to be movable in the radial direction by a driving source (not shown). It should be noted that the locking lever 61 may be driven by the driving source provided separately from the motor 51, or may be driven interlocked with the zoom drive of the lens barrel 10 by the motor 51.

As shown in FIG. 19, the bayonet engaging groove 22c has an axial groove 22c1 prolonged in the axial direction towards the rear side from the front end of the drive barrel 22 and a circumferential groove 22c2 prolonged in the circumferential direction from the rear end of the axial groove 22c1. The front end of the circumferential groove 22c2 is formed so that the width in the axial direction becomes narrow in its front end (see FIG. 20A).

When the drive barrel 22 is rotated relatively to the outside cover barrel 23 under the condition where the convex part 23a of the outside cover barrel 23 is inserted to the rear end of the axial groove 22c1 of the drive barrel 22, the convex part 23a engages with the narrow width portion at the front end of the circumferential groove 22c2. Accordingly, the drive barrel 22 is inserted into the outside cover barrel 23. The convex part 23a is equivalent to an example of the regulation part of the present invention.

The pin engagement portion 22b has a plurality of ridge walls 22b1 and a plurality of projected walls 22b2. The ridge walls 22b1 are formed in the outer periphery end at the object side of the drive barrel 22 at a predetermined interval in the circumferential direction. The projected walls 22b2 are projected towards the rear side of the drive barrel 22 from the ridge walls 22b1. The projected walls 22b2 are arranged at nearly regular intervals in the circumferential direction of the drive barrel 22. The front end of the projected wall 22b2 is formed in a tapered shape of which the width becomes narrower gradually towards the rear side of the drive barrel 22. When the operation ring 7 is moved in the optical axis direction, the pin 7a engages with a space between the projected walls 22b2 that are adjacent in the circumferential direction so that the pin 7a is detachable in the rotation direction.

Since the operation ring 7 and the drive barrel 22 rotate integrally in the state where the pins 7a of the operation ring 7 engage with the pin engagement portions 22b of the drive barrel 22 in the rotation direction, the rotary operation of the operation ring 7 rotates the drive barrel 22.

Next, the relationship between the pins 7a of the operation ring 7, the gear part 22a of the drive barrel 22, the pin engagement portions 22b, the bayonet engaging groove 22c, the convex part 23a of the outside cover barrel 23, and the gear 53 will be described with reference to FIG. 20A through FIG. 24B.

Figure 20A:
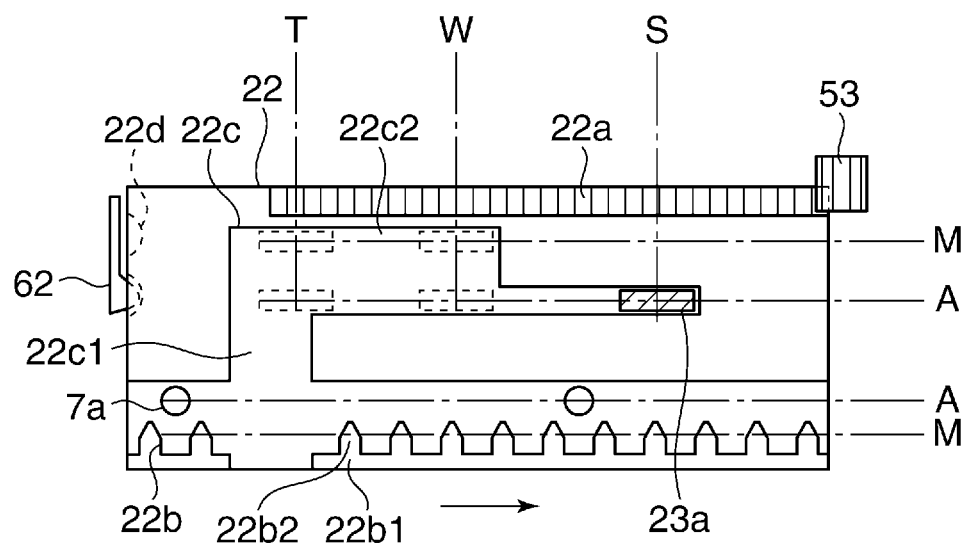
FIG. 20A is a developed view showing an outer periphery of the drive barrel shown in FIG. 19 in a state where power of the camera is OFF and the lens barrel is in the collapsed position.

FIG. 20A is a developed view showing an outer periphery of the drive barrel 22 in a state where the power of the camera is OFF and the lens barrel 10 is in the collapsed position. As shown in FIG. 20A, the convex part 23a of the outside cover barrel 23 is located in a collapsed position S in the bayonet engaging groove 22c of the drive barrel 22. A wide position W on which the convex part 23a is located in the wide state of the lens barrel and a telephoto position T on which the convex part 23a is located in the telephoto state of the lens barrel are shown in FIG. 20A. Moreover, alternate long-and-short dash lines A show positions (A positions) of the convex part 23a and the pin 7a in the electric zoom drive. Alternate long-and-short dash lines M show positions (M positions) of the convex part 23a and the pin 7a in the manual zoom drive.

Then, the convex part 23a of the outside cover barrel 23 engages with the narrow width portion of the circumferential groove 22c2 of the bayonet engaging groove 22c within the section between the collapsed position S and just before the wide position W in order to regulate the position of the drive barrel 22 and to maintain the engagement of the gear part 22a of the drive barrel 22 with the gear 53.

Two grooves 22d that are prolonged in the circumferential direction and are mutually separated in the optical axis direction are formed in the side surface of the drive barrel 22. When the drive barrel 22 moves in the optical axis direction, engagement of a clicking plate 62 with each of the two grooves 22d gives a click operation feeling such that the drive barrel 22 stops each of the electric zoom drive position and manual zoom drive position to the operation ring 7 via the drive barrel 22.

In the state in FIG. 20A, since the pin 7a of the operation ring 7 is in the A-position and does not engage with the pin engagement portion 22b of the drive barrel 22, the rotary operation of the operation ring 7 does not rotate the drive barrel 22. In the second embodiment, the lens barrel 10 is driven electrically because the gear part 22a of the drive barrel 22 meshes with the gear 53 during a process from the collapsed position S where the power of the camera is OFF to the wide position W. At this time, the click board 62 engages with the groove 22d of the drive barrel 22 at the lower side in the drawing, and accordingly, the drive barrel 22 is kept so as not to move in the optical axis direction carelessly.

Figure 20B:
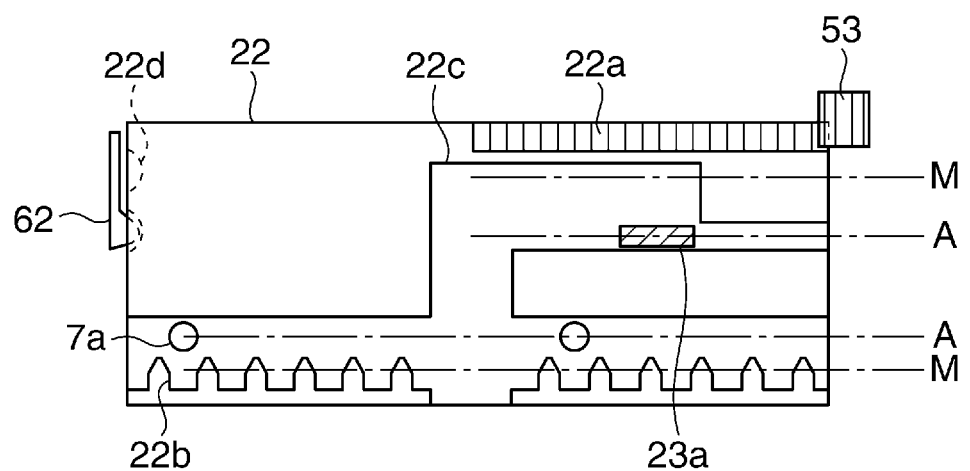
FIG. 20B is a developed view showing the outer periphery of the drive barrel shown in FIG. 19 in a state where the power of the camera is turned ON and the lens barrel is moved to a wide position.

FIG. 20B is a developed view showing the outer periphery of the drive barrel in a state where the lens barrel 10 is moved to the wide position W by the electric zoom drive. FIG. 20B shows the state of the drive barrel 22 that was rotated in an arrow direction (the rightward direction in the drawing) from the state in FIG. 20A by the electric zoom drive. In the photographing state between the wide position W shown in FIG. 20B and the telephoto position T, the convex part 23a of the outside cover barrel 23 engages with a wide width portion in the circumferential groove 22c2 of the bayonet engaging groove 22c in order to enable the movement of the drive barrel 22 in the optical axis direction. Accordingly, although the convex part 23a is in the A-position after the lens barrel 10 moves to the wide position W, the drive barrel 22 is movable in the optical axis direction.

Figure 21A:
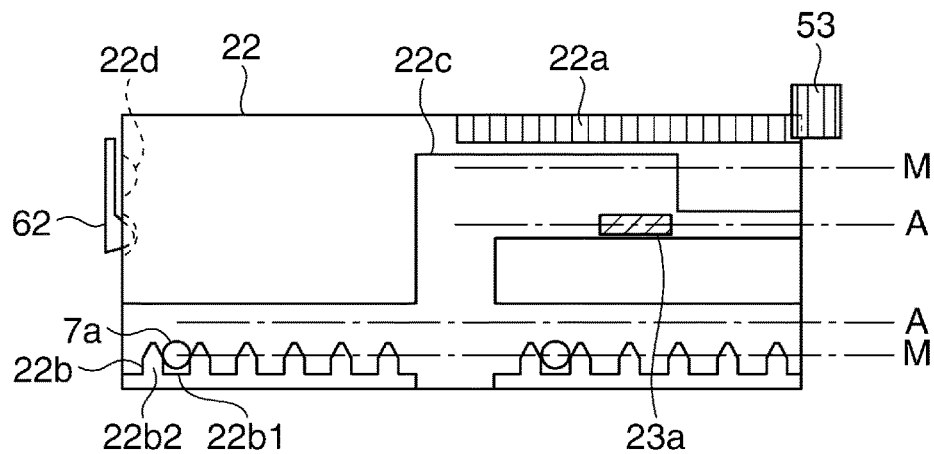
FIG. 21A and FIG. 21B are developed views showing the outer periphery of the drive barrel shown in FIG. 19 in the wide position in states before and after the lens barrel is shifted to a manual zoom operation from an electric zoom operation.
Figure 21B:
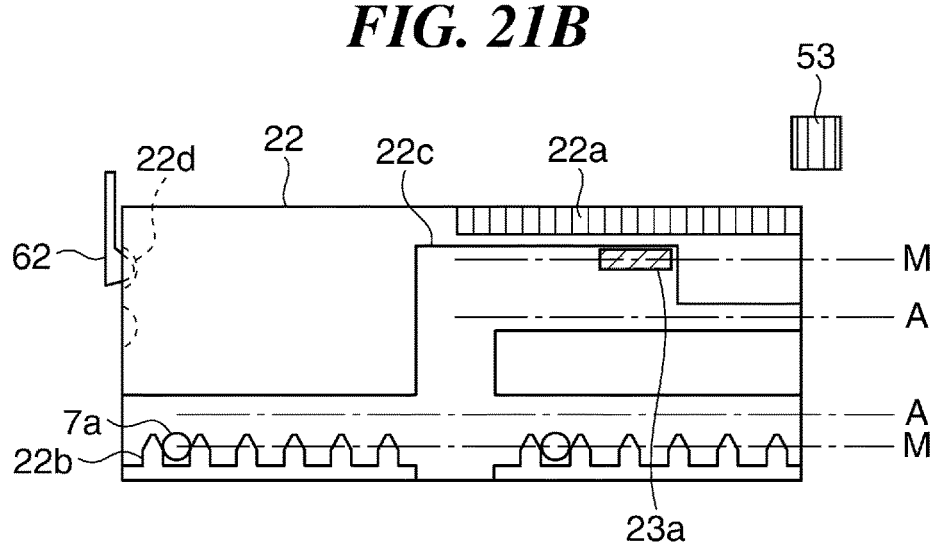

FIG. 21A and FIG. 21B are developed views showing the outer periphery of the drive barrel 22 in states before and after the lens barrel 10 in the wide position is shifted to the manual zoom operation from the electric zoom operation, When shifting to the manual zoom operation from the electric zoom operation, an operator operates the operation ring 7 from the state in FIG. 20B toward the extension side (lower side in the drawings) in the optical axis direction first. Accordingly, the pin 7a of the operation ring 7 engages with the pin engagement portion 22b of the drive barrel 22 as shown in FIG. 21A, and the drive barrel 22 becomes rotatable together with the operation ring 7.

In this state, when the operation ring 7 is further operated toward the extension side in the optical axis direction, the pin 7a of the operation ring 7 pushes the pin engagement portion 22b of the drive barrel 22, and the drive barrel 22 moves toward the extension side in the optical axis direction together with the operation ring 7. The movement of the drive barrel 22 releases the engagement of the gear part 22a with the gear 53 as shown in FIG. 21B, and the convex part 23a is arranged in the M-position. At this time, the click board 62 engages with the groove 22d of the drive barrel 22 at the upper side in the drawing, and accordingly, the drive barrel 22 is kept so as not to move in the optical axis direction carelessly.

Figure 22:
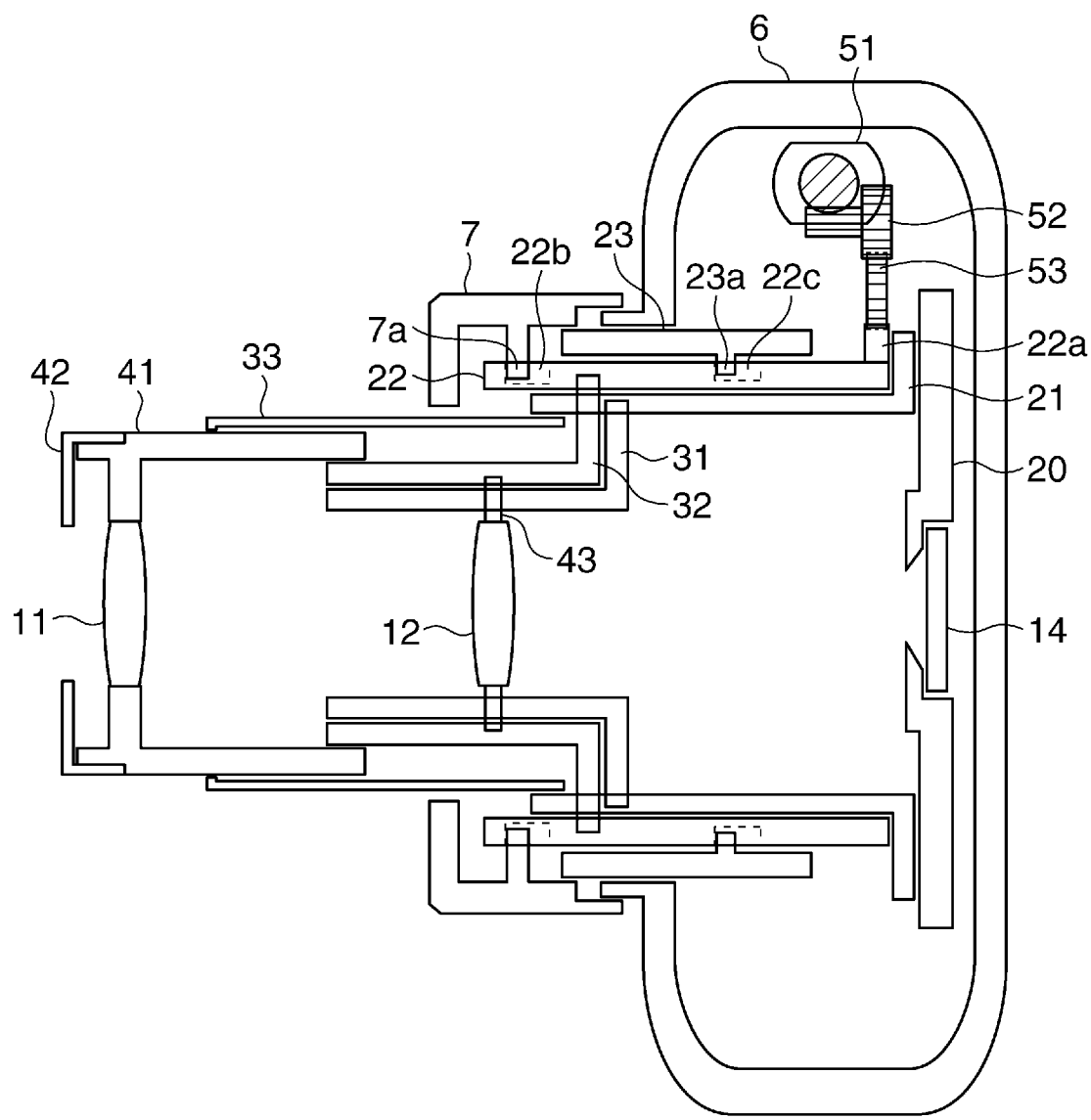
FIG. 22 is a sectional view schematically showing the camera in the state in FIG. 21A.
Figure 23:
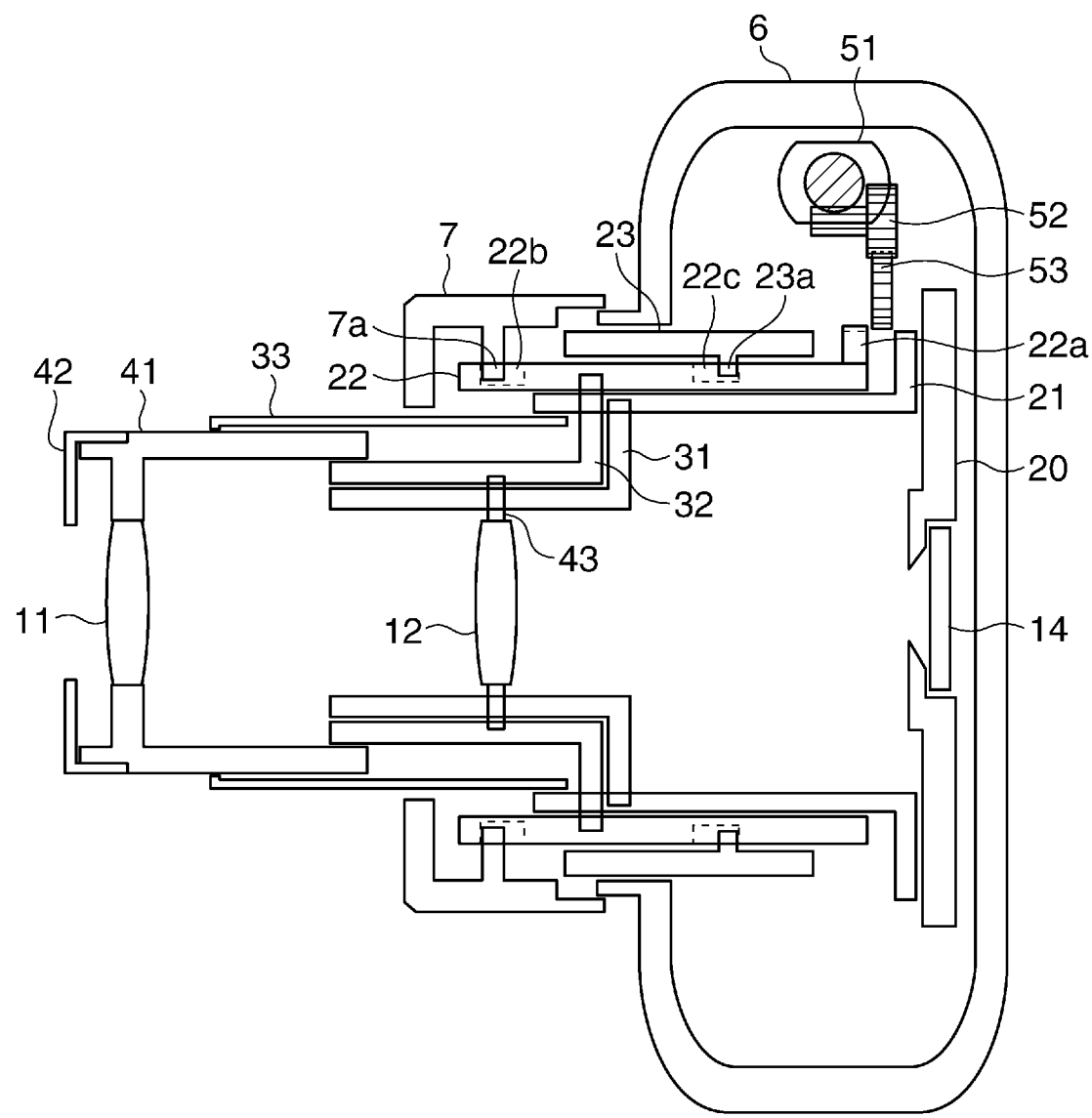
FIG. 23 is a sectional view schematically showing the camera in the state in FIG. 21B.

In the state shown in FIG. 21B, the connection between the motor 51 and the drive barrel 22 is released, and the manual rotary operation of the operation ring 7 makes the drive barrel 22 rotate together with the operation ring 7, which enables the manual zoom operation. FIG. 22 is a sectional view schematically showing the camera in the state in FIG. 21A. FIG. 23 is a sectional view schematically showing the camera in the state in FIG. 21B.

Figure 21C:
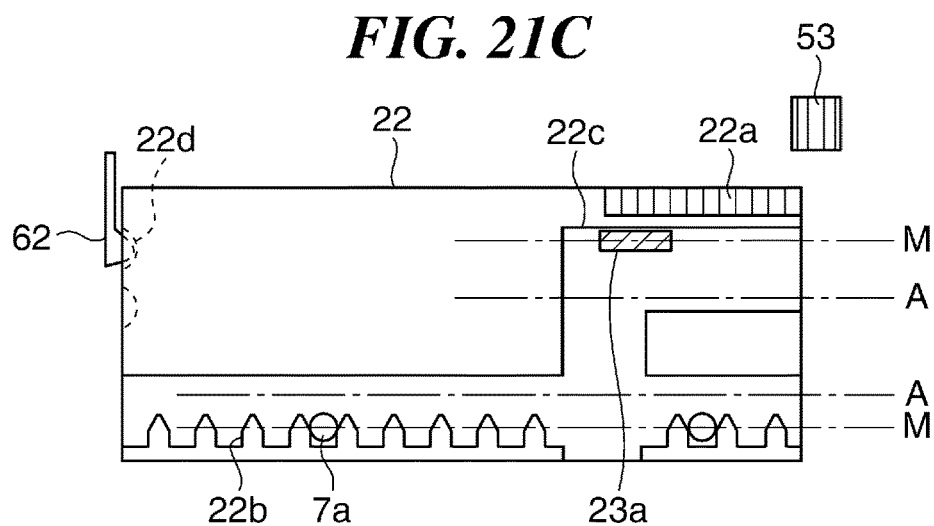
FIG. 21C is a developed view showing the outer periphery of the drive barrel shown in FIG. 19 in a state where the lens barrel is moved to a telephoto position by the manual zoom operation.

FIG. 21C is a developed view showing the outer periphery of the drive barrel 22 in a state where the lens barrel 10 is moved to the telephoto position by the manual zoom operation. In addition to the illustrated positions, the drive barrel 22 is able to be stopped in an arbitrary intermediate position between the wide position W (FIG. 21B) and the telephoto position T (FIG. 21C).

Figure 24A:
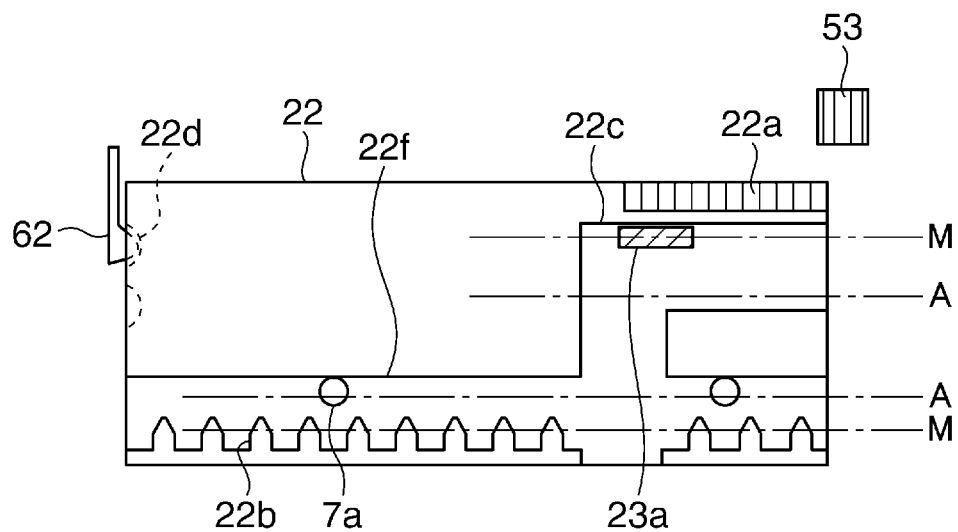
FIG. 24A and FIG. 24B are developed views showing the outer periphery of the drive barrel shown in FIG. 19 in states before and after the lens barrel is shifted to the electric zoom operation from the manual zoom operation in the telephoto position.
Figure 24B:
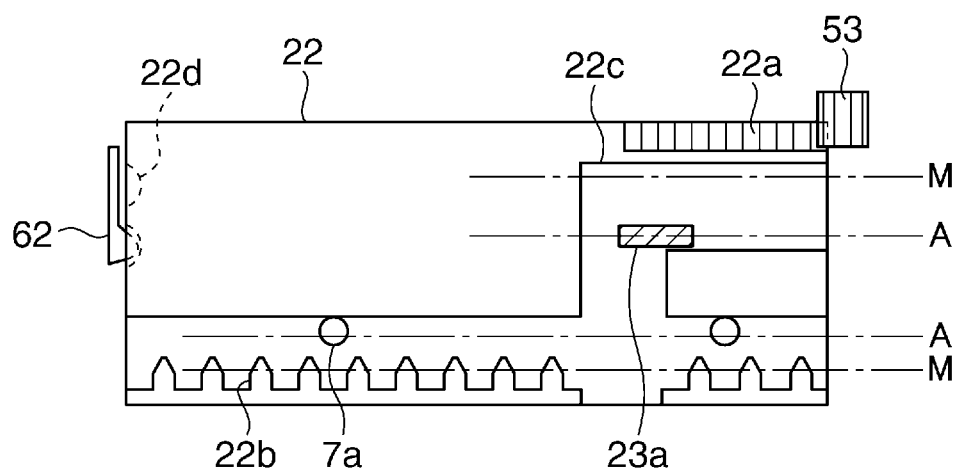

FIG. 24A and FIG. 24B are developed views showing the outer periphery of the drive barrel 22 in states before and after the lens barrel 10 in the telephoto position is shifted to the electric zoom operation from the manual zoom operation, First, when an operator operates the operation ring 7 toward the retraction side (the upper side in the drawing) in the optical axis direction from the state in FIG. 21C first, the pin 7a of the operation ring 7 goes away from the pin engagement portion 22b of the drive barrel 22 as shown in FIG. 24A. Accordingly, the rotary operation of the operation ring 7 does not rotate the drive barrel 22.

At this time, the pin 7a of the operation ring 7 comes in contact with a side wall 22f that is opposite to the pin engagement portion 22b of the drive barrel 22 in the optical axis direction. Accordingly, when the operation ring 7 is further operated toward the retraction side in the optical axis direction, the pin 7a of the operation ring 7 pushes the side wall 22f of the drive barrel 22, and the drive barrel 22 moves toward the retraction side in the optical axis direction together with the operation ring 7 as shown in FIG. 24B. Accordingly, the gear 53 meshes with the gear part 22a, and the convex part 23a is arranged in the A-position. Accordingly, the driving force of the motor 51 is transferred to the gear part 22a via the gear 53 to rotate the drive barrel 22, which enables the electric zoom operation.

It should be noted that the change to the manual zoom operation from the electric zoom operation, otherwise the change to the electric zoom operation from the manual zoom operation are available also in an intermediate position other than the wide position W and telephoto position T. Moreover, it is necessary to engage the convex part 23a with the narrow width portion in the circumferential groove 22c2 of the bayonet engaging groove 22c in the section between the wide position W and the collapsed position S, as shown in FIG. 20A. Then, it is necessary to arrange the convex part 23a in the A-position as shown in FIG. 24B in order to engage the convex part 23a with the narrow width portion in the circumferential groove 22c2. Accordingly, when the power of the camera is turned OFF in the state allowing the manual zoom operation, it is necessary to once change to the electric zoom operation before performing the collapsing operation.

Next, the operation of the camera will be described with reference to FIG. 25, FIG. 26A, and FIG. 26B. It should be noted that the processes in FIG. 25 through FIG. 27 are performed so that a CPU of a control circuit in the camera body 6 develops programs stored in a ROM to a RAM and performs the program (not shown).

Moreover, the position of the operation ring 7 in the optical axis direction shall be detected by a ring position detection unit (not shown) corresponding to the position of the pin 7a. The position of the drive barrel 22 against the convex part 23a in the optical axis direction shall be detected by a drive-barrel-position-detecting unit (not shown). A photo reflector is used as the ring position detection unit and the drive-barrel-position-detecting unit, for example.

Furthermore, in the second embodiment, the engagement of the gear 53 at the side of the motor 51 with the gear part 22a of the drive barrel 22 can be released in an arbitrary position in the section between the wide position W and telephoto position T of the lens barrel 10 so that the operation ring 7 can be manually rotated freely with the drive barrel 22. Accordingly, when the position of the lens barrel 10 in the optical axis direction is detected on the basis of the rotation-output pulse of the motor 51, inconsistency will occur. Thus, the position of the lens barrel 10 in the optical axis direction is detected on the basis of a detection signal of a device that detects the position of the lens barrel 10 relative to a home position in addition to the pulse signal of the motor 51.

Figure 25:
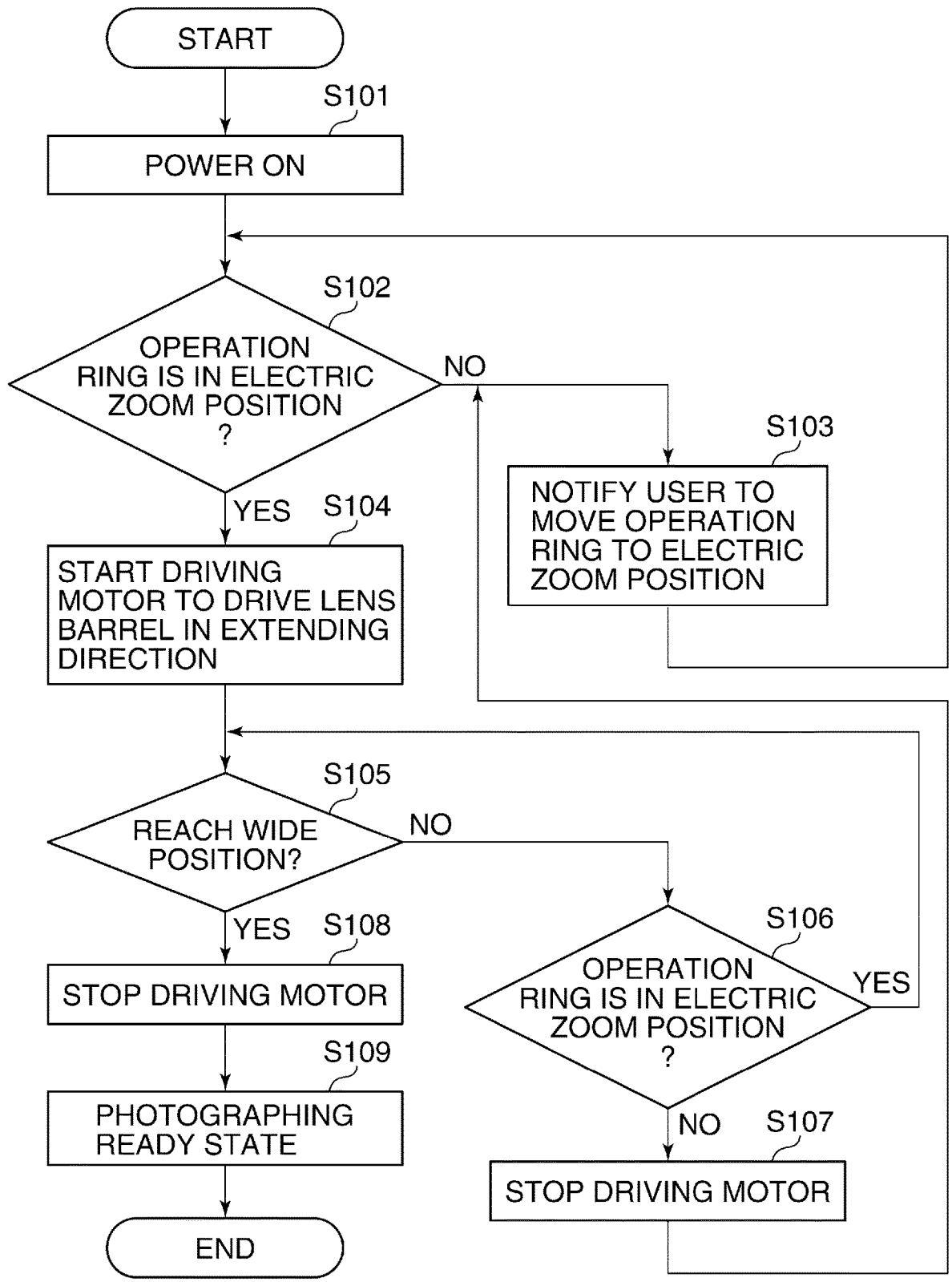
FIG. 25 is a flowchart describing operations from a power OFF state to a photographing-ready state in the digital camera shown in FIG. 16.

FIG. 25 is a flowchart describing camera operations from a power OFF state to a photographing-ready state in the digital camera.

When the camera power is turned ON in step S101, the process proceeds to step S102, and the control circuit determines whether the operation ring 7 is in the electric zoom position on the basis of the detection result of the ring position detection unit (not shown). Then, when the operation ring 7 is in the electric zoom position, the process proceeds to step S104. When the operation ring 7 is not in the electric zoom position (the operation ring 7 is pulled), the process proceeds to step S103.

The control circuit notifies a user to move the operation ring 7 to the electric zoom position by displaying a message on a display unit (not shown) of the camera body 6 or by outputting a voice messages etc. in the step S103, and returns the process to the step S102. In the step S104, the motor 51 is driven to start moving the lens barrel in the extending direction, and the process proceeds to step S105.

In the step S105, the control circuit determines whether the lens barrel 10 reached the wide position on the basis of the pulse signal of the motor 51, etc. The process proceeds to step S108 if reached. Otherwise, the process proceeds to step 106.

In the step S106, the control circuit determines whether the operation ring 7 is maintained in the electric zoom position during the lens barrel extension drive until the lens barrel 10 reaches the wide position. Then, when the operation ring 7 is maintained in the electric zoom position, the control circuit returns the process to the step S105. When the operation ring 7 is not in the electric zoom position, the control circuit proceeds with the process to step S107.

The control circuit once stops driving the motor 51 in the step S107, notifies the user to move the operation ring 7 to the electric zoom position in the step S103, and returns the process to the step S102. The operations in the steps S107 and S103 aim to maintain the electric zoom operation by preventing the engagement with the gear 53 from releasing, when the operation ring 7 is pulled in the manual zoom position. The control circuit stops driving the motor 51 in the wide position in the step S108, shifts to the photographing-ready state in step S109, and finishes the process.

Figure 26A:
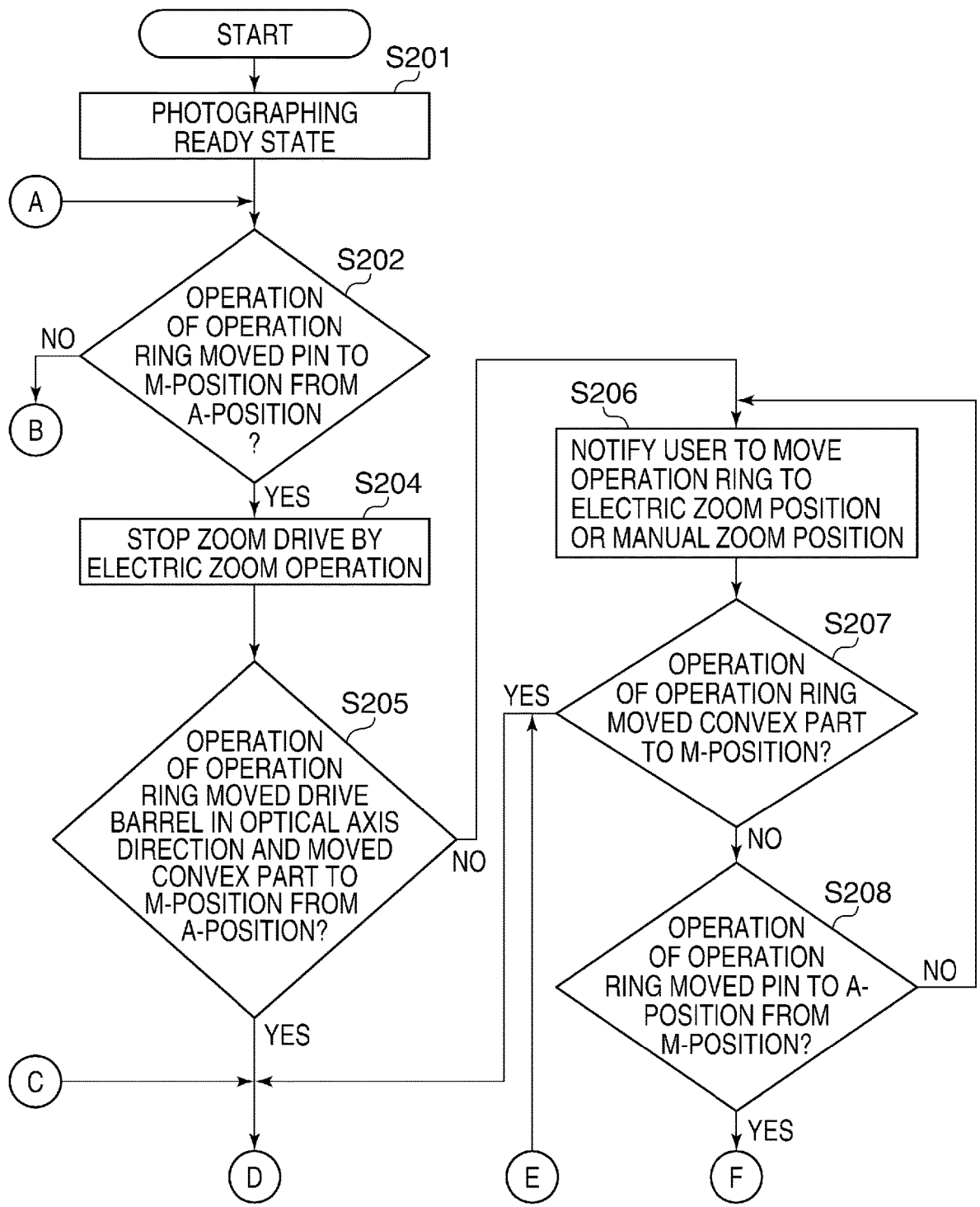
FIG. 26A and FIG. 26B are flowcharts describing a process for switching the zoom operation mode of the digital camera shown in FIG. 16 between the electric zoom operation and the manual zoom operation under the photographing-ready state.
Figure 26B:
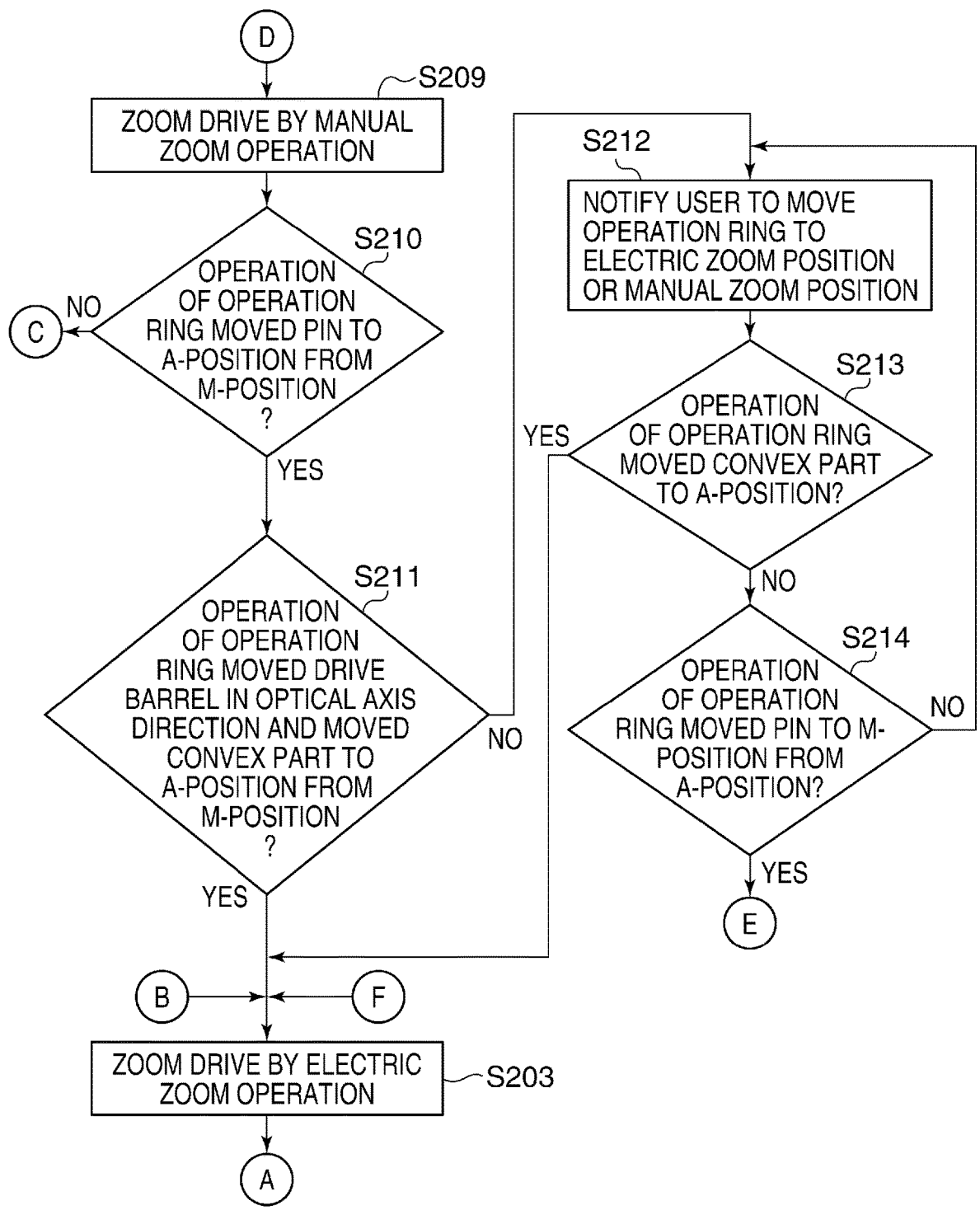
Figure 27:
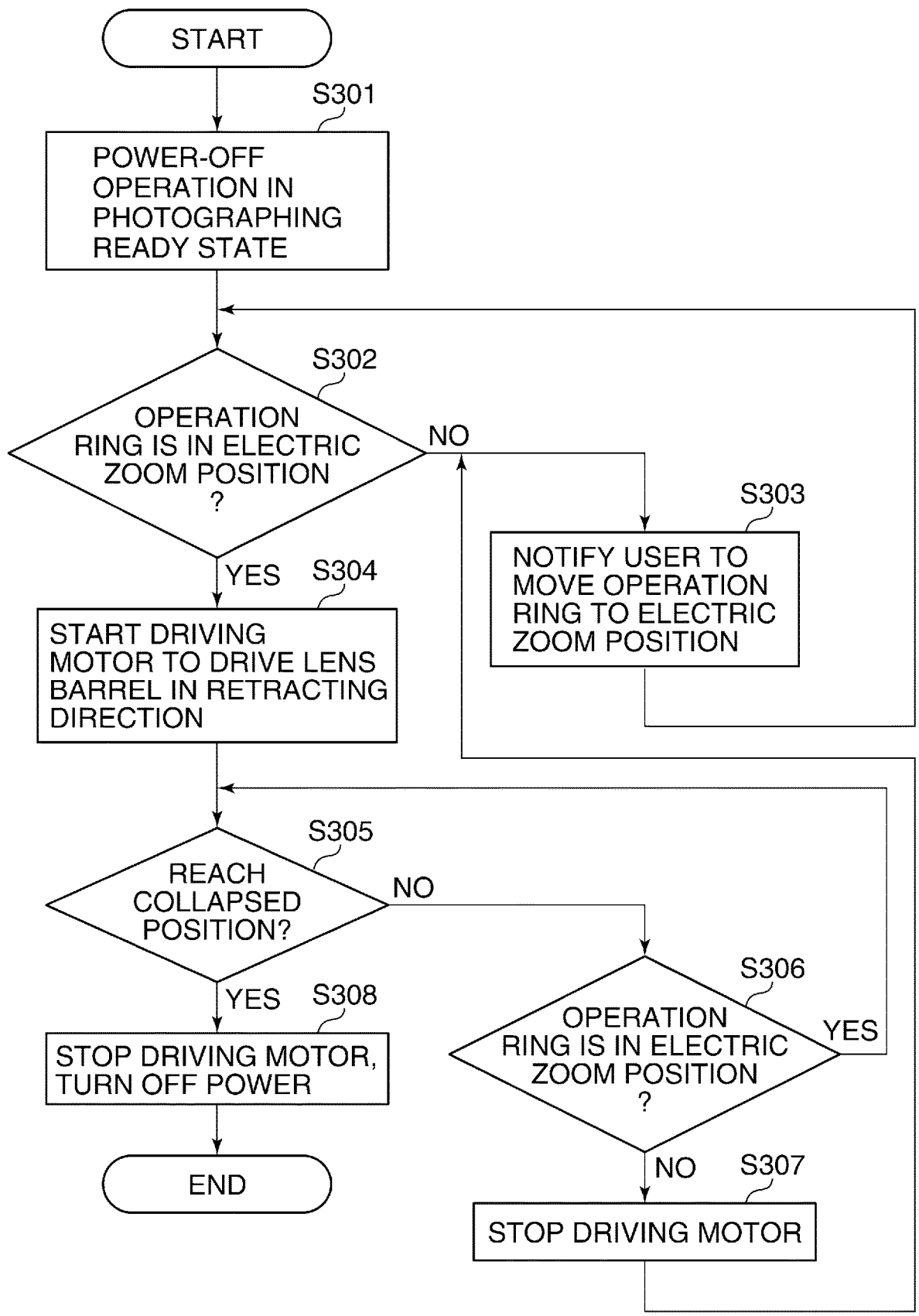
FIG. 27 is a flowchart describing a process from the photographing-ready state to the power OFF state in the digital camera shown in FIG. 16.

FIG. 26A and FIG. 26B are flowcharts describing a process for switching the zoom operation mode between the electric zoom operation and the manual zoom operation under the photographing-ready state. It should be noted that three states are assumed in the section between the wide position and telephoto position where the switching process is allowable. In the first state, both the pin 7a of the operation ring 7 and the convex part 23a are in the A-positions (FIG. 20B). In the second state, the pin 7a is in the M-position and the convex part 23a is in the A-position (FIG. 21A). In the third state, both the pin 7a and the convex part 23a are in the A-positions (FIG. 21B). The process in FIG. 26A and FIG. 26B enables the electric zoom operation in the first state in FIG. 20B, enables the manual zoom operation in the third state in FIG. 21B, and urges to select one of the electric and manual zoom operations in the second state in FIG. 21A by determining the positions of the pin 7a and the convex part 23a.

When the camera shifted to the photographing-ready state in step S201, the control circuit determines whether the pin 7a was moved to the M-position from the A-position according to the operation of the operation ring 7 in step S202 on the basis of the detection result of the ring position detection unit (not shown). Then, when the pin 7a was not moved to the M-position, the control circuit proceeds with the process to step S203, continues the electric zoom operation, and returns the process to the step S202. When the pin 7a was moved to the M-position, the process proceeds to step S204.

The control circuit stops the electric zoom drive by stopping driving the motor 51 in the step S204, and proceeds with the process to step S205. In the step S205, the control circuit determines whether the movement of the drive barrel 22 in the optical axis direction due to the operation of the operation ring 7 moved the convex part 23a to the M-position from the A-position on the basis of the detection result of the drive-barrel-position-detecting unit (not shown). Then, when the convex part 23a was moved to the M-position, the control circuit proceeds with the process to step S209. When the convex part 23a was not moved to the M-position, the control circuit proceeds with the process to step S206. The control circuit maintains the stopped state of the motor 51 and allows the manual zoom drive in the step S209, and proceeds with the process to step S210. Accordingly, the electric zoom operation is switched to the manual zoom operation.

In the step S210, the control circuit determines whether the operation of the operation ring 7 moved the pin 7a to the A-position from the M-position on the basis of the detection result of the ring position detection unit (not shown). When the pin 7a was not moved to the A-position, the process returns to the step S209. When it is determined that the pin 7a moved to the A-position, the process proceeds to step S211. In the step S211, the control circuit determines whether the movement of the drive barrel 22 in the optical axis direction due to the operation of the operation ring 7 moved the convex part 23a to the A-position from the M-position on the basis of the detection result of the drive-barrel-position-detecting unit (not shown). Then, when the convex part 23a was moved to the A-position from the M-position, the control circuit proceeds with the process to the step S203 and shifts to the electric zoom drive. When the convex part 23a was not moved to the A-position, the control circuit proceeds with the process to step S212.

The control circuit notifies the user to move the operation ring 7 to the electric zoom position or the manual zoom position by displaying a message on a display unit (not shown) of the camera body 6 or by outputting a voice message, etc. in the step S212, and proceeds with the process to step S213.

In the step S213, the control circuit determines whether the operation of the operation ring 7 moved the convex part 23a to the A-position on the basis of the detection result of the drive-barrel-position-detecting unit (not shown). Then, when the convex part 23a was moved to the A-position, the control circuit proceeds with the process to step S203. When the convex part 23a was not moved to the A-position, the control circuit proceeds with the process to step S214. In the step S214, the control circuit determines whether the operation of the operation ring 7 moved the pin 7a to the M-position from the A-position on the basis of the detection result of the ring position detection unit (not shown). When the movement to the M-position is detected, the process returns to the step S209, and the manual zoom drive continue. When the pin 7a was not moved to the M-position, the process returns to the step S212 to repeat notification.

On the other hand, the control circuit notifies the user to move the operation ring 7 to the electric zoom position or the manual zoom position by displaying a message on a display unit (not shown) of the camera body 6 or by outputting a voice message, etc. in the step S206, and proceeds with the process to the step S207.

In the step S207, the control circuit determines whether it was detected that the operation of the operation ring 7 moved the convex part 23a to the M-position. When the movement to the M-position was detected, the process proceeds to the step S209 to shift to the manual zoom drive. Otherwise, the process proceeds to step S208. In the step S208, the control circuit determines whether the operation of the operation ring 7 moved the pin 7a to the A-position from the M-position on the basis of the detection result of the ring position detection unit (not shown). When the movement to the A-position is detected, the process proceeds to the step S203 to shift to the electric zoom drive. When the pin 7a was not moved to the A-position, the process returns to the step S206 to repeat notification.

The processes in the steps S205 through S208 and the steps S210 and S211 aim to prevent a halfway state where both the electric and manual zoom operations become impossible when the zoom mode is switched between the electric zoom operation and manual zoom operation.

FIG. 27 is a flowchart describing a process from the photographing-ready state to the power OFF state of the camera.

When the power of the camera was turned OFF in the photographing-ready state in step S301, the control circuit determines whether the operation ring 7 is in the electric zoom position in step S302 on the basis of the detection result of the ring position detection unit (not shown). Then, when the operation ring 7 is in the electric zoom position, the process proceeds to step S304. When the operation ring 7 is not in the electric zoom position (the operation ring 7 is pulled), the process proceeds to step S303.

The control circuit notifies the user to move the operation ring 7 to the electric zoom position by displaying a message on a display unit (not shown) of the camera body 6 or by outputting a voice message, etc. in the step S303, and returns the process to the step S302. In the step S304, the motor 51 is driven to start moving the lens barrel in the retracting direction, and the process proceeds to step S305.

In the step S305, the control circuit determines whether the lens barrel 10 reached the collapsed position on the basis of the pulse signal of the motor 51, etc. When the lens barrel 10 reached the collapsed position, the control circuit proceeds with the process to step S308, turns OFF the power of the camera after stopping driving the motor 51, and finishes the process. When the lens barrel 10 does not reach the collapsed position, the process proceeds to step S306.

In the step S306, the control circuit determines whether the operation ring 7 is maintained in the electric zoom position during the lens barrel retracting drive until the lens barrel 10 reaches the collapsed position. Then, when the operation ring 7 is maintained in the electric zoom position, the control circuit returns the process to the step S305. When the operation ring 7 is not in the electric zoom position, the control circuit proceeds with the process to step S307.

The control circuit once stops driving the motor 51 in the step S307, notifies the user to move the operation ring 7 to the electric zoom position in the step S303, and returns the process to the step S302. The operations in the steps S307 and S303 aim to maintain the electric zoom operation by preventing the engagement with the gear 53 from releasing, when the operation ring 7 is pulled in the manual zoom position.

As described above, the second embodiment enables to switch the electric zoom operation and the manual zoom operation by the operation ring 7 the lens barrel with the simple mechanism, and improves operability of the manual operation of the operation ring.

Next, a digital camera according to a third embodiment of an image pickup apparatus equipped with a lens driving device of the invention will be described with reference to FIG. 28 to FIG. 29. It should be noted that duplicated sections with respect to the above-mentioned second embodiment will be described by diverting the figures and the signs.

The third embodiment employs the mechanism shown in FIG. 18 that regulates the movement of the operation ring 7 in the optical axis direction by engaging the locking lever 61 provided in the camera body 6 with the groove portion 7b of the operation ring 7 when the operation ring 7 is in the electric zoom position. When the locking lever 61 is used, the determination about whether the operation ring 7 is in the electric zoom position in each of the steps S102 and S106 in FIG. 25 and the step S306 in FIG. 27 becomes unnecessary.

Figure 28:
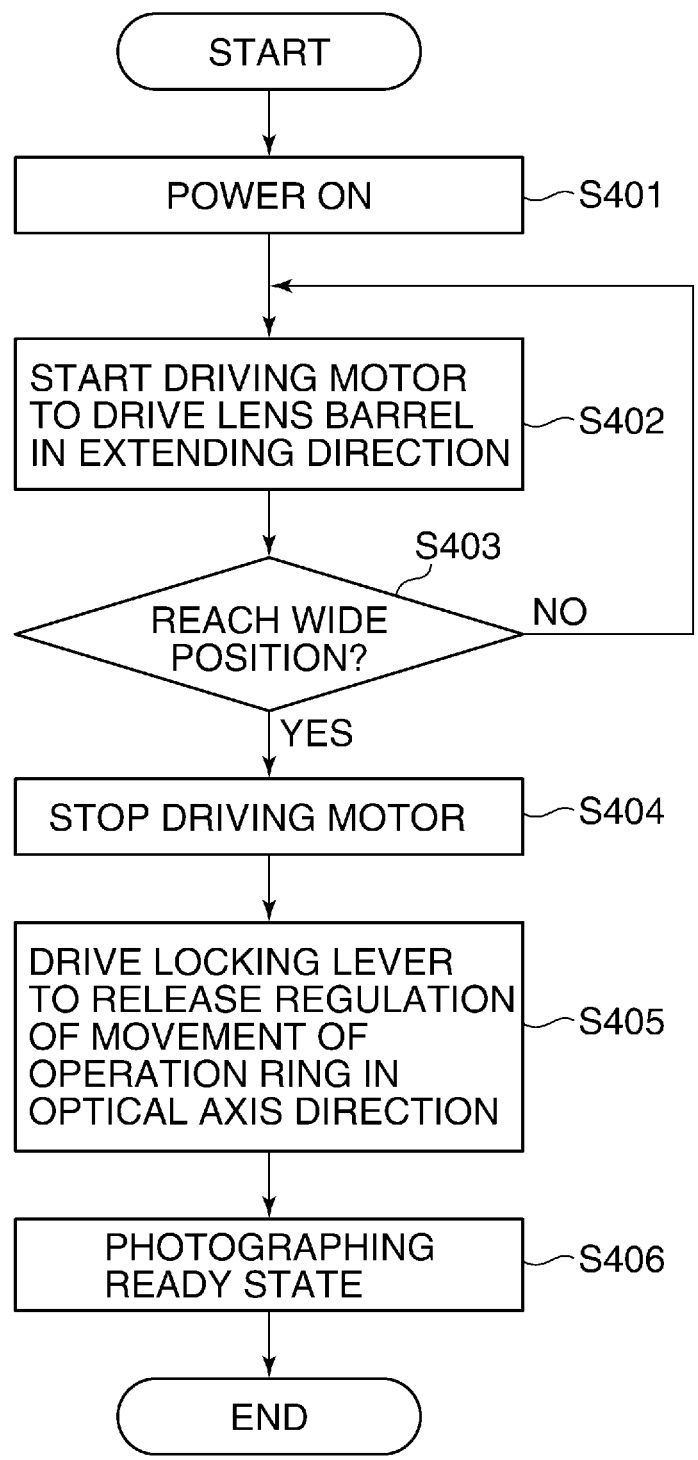
FIG. 28 is a flowchart describing camera operations from the power OFF state to the photographing-ready state in a digital camera as a third embodiment of the image pickup apparatus equipped with the lens driving device of the present invention.

FIG. 28 is a flowchart describing camera operations from the power OFF of the digital camera to the photographing-ready state.

When the power of the camera turns ON in step S401, the control circuit drives the motor 51 to start moving the lens barrel in the extending direction in step S402, and proceeds with the process to step S403. In the step S403, the control circuit determines whether the lens barrel 10 reached to the wide position on the basis of the pulse signal of the motor 51, etc. When reached, the process proceeds to step S404. Otherwise, the process returns to the step S402.

The control circuit stops driving the motor 51 in the wide position in the step S404, and proceeds with the process to step S405. In step S405, The control circuit drives the locking lever 61 so as to go away from the groove portion 7b to release regulation of movement of the operation ring 7 in the optical axis direction in the step S405, shifts to the photographing-ready state in step S406, and finishes the process.

Figure 29:
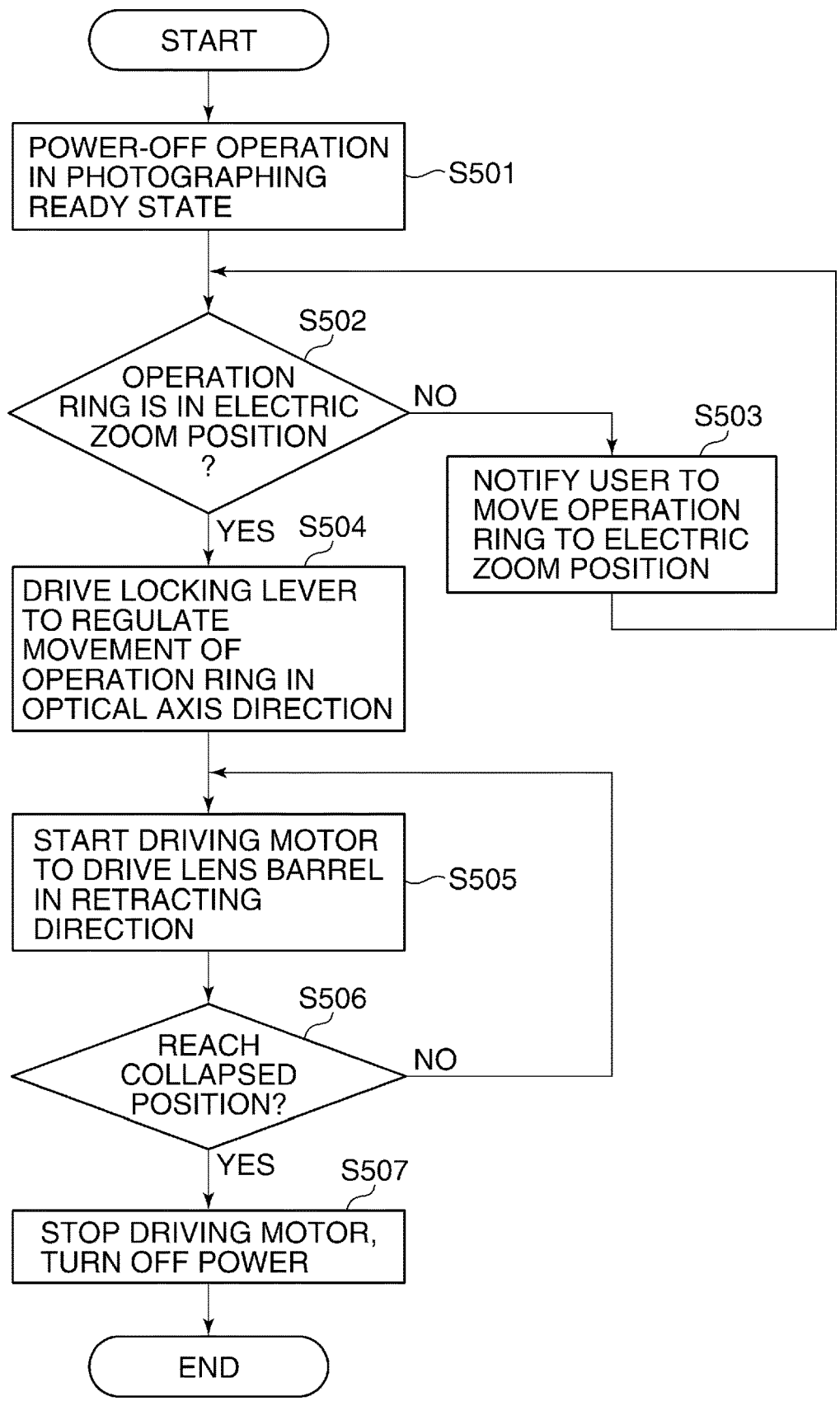
FIG. 29 is a flowchart describing a process from the photographing-ready state to the power OFF state in the digital camera of the third embodiment.

FIG. 29 is a flowchart describing a process from the photographing-ready state to the power OFF of the camera.

When the power of the camera was turned OFF in the photographing-ready state in step S501, the control circuit determines whether the operation ring 7 is in the electric zoom position in step S502 on the basis of the detection result of the ring position detection unit (not shown). Then, when the operation ring 7 is in the electric zoom position, the process proceeds to step S504. When the operation ring 7 is not in the electric zoom position (the operation ring 7 is pulled), the process proceeds to step S503.

The control circuit notifies the user to move the operation ring 7 to the electric zoom position by displaying a message on a display unit (not shown) of the camera body 6 or by outputting a voice messages etc. in the step S503, and returns the process to the step S502. The control circuit drives the locking lever 61 so as to engage with the groove portion 7b to regulate the movement of the operation ring 7 in the optical axis direction in the step S504, and proceeds with the process to step S505.

In the step S505, the motor 51 is driven to start moving the lens barrel in the retracting direction, and the process proceeds to step S506. In the step S506, the control circuit determines whether the lens barrel 10 reached the collapsed position on the of the pulse signal of the motor 51, etc. When reached, the process proceeds to step S507. Otherwise, the process returns to the step 505. The control circuit stops driving the motor 51 in the collapsed position to turn OFF the power of the camera in the step S507, and finishes the process. The other configurations and operational effects are the same as that of the above-mentioned second embodiment.

In the above-mentioned embodiments, although the manual/electric switching about lens drive for zooming were described as an example, the present invention is not limited to the embodiments. The present invention is applicable to a manual/electric switching about lens drive for focusing. Moreover, although the above-mentioned embodiments exemplified a digital camera as an image pickup apparatus, the present invention is not limited to this. The present invention is applicable to a digital video camera and other image pickup apparatus. Furthermore, the above-mentioned second embodiment uses the pin engagement portion 22b that is formed by the walls having the tapered forms. Alternatively, the pin 7a may be frictionally engaged with an elastic member, such as sponge.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-162686, filed Aug. 20, 2015 and No. 2016-020746, filed Feb. 5, 2016, which are hereby incorporated by reference herein in their entireties.

What is claimed is:

1. A lens driving device comprising:
a motor configured to provide a driving force;
a gear train configured to transfer driving force of said motor;
a drive barrel on which a gear part that is able to mesh with said gear train, said drive barrel rotating when the driving force of said motor is transferred to the gear part via said gear train, and said drive barrel moving a plurality of lens groups in an optical axis direction by rotating;
a manual operation ring that is provided on the circumference side of said drive barrel so as to be movable in the optical axis direction and to allow a rotary operation, and that engages with said drive barrel in a rotation direction and the optical axis direction so as to be detachable;
a member position detection unit configured to detect a position of said manual operation ring in the optical axis direction; and
a control unit configured to determine whether said manual operation ring engages with said drive barrel in the rotation direction based on a detection result of said member position detection unit,
wherein said drive barrel meshes with said manual operation ring in the optical axis direction and moves in the optical axis direction together with said manual operation ring so that the engagement between the gear part and said gear train is released and said drive barrel engages with the manual operation ring in the rotation direction and rotates together with the manual operation ring, when said manual operation ring is moved in the optical axis direction, and
wherein said control unit notifies a user to move said manual operation ring in the optical axis direction while stopping driving said motor, when said control unit determines that said manual operation ring engages with said drive barrel in the rotation direction.

2. The lens driving device according to claim 1, wherein zoom drive is performed by moving the lens groups between a wide position and a telephoto position in a photographing position.

3. The lens driving device according to claim 2, further comprising a barrel member configured to regulate the movement of said drive barrel in the optical axis direction when the lens groups move between a collapsed position and the wide position.

4. The lens driving device according to claim 2, further comprising a regulation mechanism configured to regulate the movement of said manual operation ring in the optical axis direction so that said manual operation ring does not engage with said drive barrel in the rotation direction, when the lens groups move between a collapsed position and the wide position.

5. The lens driving device according to claim 2,
wherein said control unit stops driving said motor, when the lens groups reach the wide position from a collapsed position in a case where said control unit determines that said manual operation ring does not engage with said derive barrel in the rotation direction.

6. A lens driving device comprising:
a motor configured to provide a driving force;
a gear train configured to transfer driving force of said motor;
a drive barrel on which a gear part that is able to mesh with said gear train, said drive barrel rotating when the driving force of said motor is transferred to the gear part via said gear train, and said drive barrel moving a plurality of lens groups in an optical axis direction by rotating;

a manual operation ring that is provided on the circumference side of said drive barrel so as to be movable in the optical axis direction and to allow a rotary operation, and that engages with said drive barrel in a rotation direction and the optical axis direction so as to be detachable;

a member position detection unit configured to detect a position of said manual operation ring in the optical axis direction; and a control unit configured to determine whether said manual operation ring engages with said drive barrel in the rotation direction based on a detection result of said member position detection unit, wherein said drive barrel meshes with said manual operation ring in the optical axis direction and moves in the optical axis direction together with said manual operation ring so that the engagement between the gear part and said gear train is released and said drive barrel engages with the manual operation ring in the rotation direction and rotates together with the manual operation ring, when said manual operation ring is moved in the optical axis direction, and wherein said control unit stops driving said motor, when said control unit determines that a state where said manual operation ring does not engage with said drive barrel in the rotation direction is changed to a state where said manual operation ring engages with said drive barrel in the rotation direction based on the detection result of the member position detection unit.

7. The lens driving device according to claim 6, further comprising a drive-barrel-position-detecting unit configured to detect a position of said drive barrel in the optical axis direction, wherein said control unit notifies a user to move said manual operation ring in the optical axis direction after stopping said motor, when said control unit determines that the engagement of said gear train with the gear part of said drive barrel is released based on a detection result of said drive-barrel-position-detecting unit.

8. The lens driving device according to claim 7, wherein said control unit notifies a user to move said manual operation ring in the optical axis direction, when said control unit determines that the state where said manual operation ring engages with said drive barrel in the rotation direction is changed to the state where said manual operation ring does not engage with said drive barrel in the rotation direction based on the detection result of the member position detection unit, and when said control unit determines that the engagement of said gear train with the gear portion is released based on the detection result of the drive-barrel-position-detecting unit.

9. An image pickup apparatus equipped with a lens driving device, the lens driving device comprising:

a motor configured to provide a driving force;

a gear train configured to transfer driving force of said motor;

a drive barrel on which a gear part that is able to mesh with said gear train, that rotates when the driving force of said motor is transferred to the gear part via said gear train, and that moves a plurality of lens groups in an optical axis direction by rotating; and a manual operation ring that is provided on the circumference side of said drive barrel so as to be movable in the optical axis direction and to allow a rotary operation, and that engages with said drive barrel in a rotation direction and the optical axis direction so as to be detachable, a member position detection unit configured to detect a position of said manual operation ring in the optical axis direction; and a control unit configured to determine whether said manual operation ring engages with said drive barrel in the rotation direction based on a detection result of said member position detection unit, wherein said drive barrel meshes with said manual operation ring in the optical axis direction and moves in the optical axis direction together with said manual operation ring so that the engagement between the gear part and said gear train is released and said drive barrel engages with the manual operation ring in the rotation direction and rotates together with the manual operation ring, when said manual operation ring is moved in the optical axis direction; and wherein said control unit notifies a user to move said manual operation ring in the optical axis direction while stopping driving said motor, when said control unit determines that said manual operation ring engages with said drive barrel in the rotation direction.

10. An image pickup apparatus equipped with a lens driving device, the lens driving device comprising:

a motor configured to provide a driving force;

a gear train configured to transfer driving force of said motor;

a drive barrel on which a gear part that is able to mesh with said gear train, said drive barrel rotating when the driving force of said motor is transferred to the gear part via said gear train, and said drive barrel moving a plurality of lens groups in an optical axis direction by rotating;

a manual operation ring that is provided on the circumference side of said drive barrel so as to be movable in the optical axis direction and to allow a rotary operation, and that engages with said drive barrel in a rotation direction and the optical axis direction so as to be detachable;

a member position detection unit configured to detect a position of said manual operation ring in the optical axis direction; and a control unit configured to determine whether said manual operation ring engages with said drive barrel in the rotation direction based on a detection result of said member position detection unit, wherein said drive barrel meshes with said manual operation ring in the optical axis direction and moves in the optical axis direction together with said manual operation ring so that the engagement between the gear part and said gear train is released and said drive barrel engages with the manual operation ring in the rotation direction and rotates together with the manual operation ring, when said manual operation ring is moved in the optical axis direction, and wherein said control unit stops driving said motor, when said control unit determines that a state where said manual operation ring does not engage with said drive barrel in the rotation direction is changed to a state where said manual operation ring engages with said drive barrel in the rotation direction based on the detection result of the member position detection unit.

* * * * *